United States Patent [19]

Kerstens et al.

[11] Patent Number: 5,248,876
[45] Date of Patent: Sep. 28, 1993

[54] TANDEM LINEAR SCANNING CONFOCAL IMAGING SYSTEM WITH FOCAL VOLUMES AT DIFFERENT HEIGHTS

[75] Inventors: Pieter J. Kerstens, Beacon, N.Y.; Jon R. Mandeville, Redmond, Wash.; Frederick Y. Wu, Cos Cob, Conn.

[73] Assignee: International Business Machines Corporation, Armonk, N.Y.

[21] Appl. No.: 871,458

[22] Filed: Apr. 21, 1992

[51] Int. Cl.5 .............. G01N 21/86; G01B 11/24
[52] U.S. Cl. .................. 250/561; 250/201.3; 250/201.4; 250/227.26; 356/376
[58] Field of Search ............ 250/216, 201.3, 234–236, 250/561, 227.2, 227.26; 356/376, 371; 359/372, 368

[56] References Cited

U.S. PATENT DOCUMENTS

| | | |
|---|---|---|
| 3,485,552 | 12/1969 | Alder . |
| 3,547,546 | 12/1970 | Schier . |
| 3,853,395 | 12/1974 | Yevick . |
| 3,873,216 | 3/1975 | Gropper et al. . |
| 4,074,933 | 2/1978 | Yevick . |
| 4,130,345 | 12/1978 | Doellner . |
| 4,246,338 | 1/1981 | Kaplan . |
| 4,578,615 | 3/1986 | Genovese et al. . |
| 4,598,977 | 7/1986 | Kobayashi . |
| 4,634,880 | 1/1987 | Lindow et al. . |
| 4,748,335 | 5/1988 | Lindow et al. ............ 250/561 |
| 4,802,748 | 2/1989 | McCarthy et al. . |
| 4,806,004 | 2/1989 | Wayland . |
| 4,815,816 | 3/1989 | Schneider . |
| 4,844,617 | 7/1989 | Kelderman et al. ............ 356/376 |
| 4,893,008 | 1/1990 | Horikawa . |
| 4,927,254 | 5/1990 | Kino et al. . |
| 4,965,441 | 10/1990 | Picard ............ 250/201.3 |
| 5,004,307 | 4/1991 | Kino et al. . |
| 5,004,321 | 4/1991 | Feldman et al. . |
| 5,022,743 | 6/1991 | Kino et al. . |
| 5,032,720 | 7/1991 | White . |
| 5,065,008 | 11/1991 | Hakamata et al. ............ 250/216 |
| 5,081,350 | 1/1992 | Iwasaki et al. ............ 250/234 |
| 5,153,428 | 10/1992 | Ellis ............ 250/234 |

FOREIGN PATENT DOCUMENTS 57-125918 5/1982 Japan .
1-188816 7/1989 Japan .

(List continued on next page.)

OTHER PUBLICATIONS

United Technologies Optical Systems, Monolithic Lenslet Module, Adaptive Optics Associates, Inc. (no date).

(List continued on next page.)

Primary Examiner—David C. Nelms
Assistant Examiner—Michael Messinger
Attorney, Agent, or Firm—Whitham & Marhoefer

[57] ABSTRACT

A confocal imaging system utilizes an opaque mask with a slit and a row of pinpoint sensors or utilizes an opaque mask with a skewed pattern of pinholes and an array of isolated pinpoint sensors in a matching pattern in order to obtain sufficient data to provide a complete image for imaging and/or inspecting an object such as electronics in a single one-dimensional scan. The system also simultaneously produces multiple images at different heights in the single one-dimensional scan of the viewed object, and also simultaneously produces images taken in different spectral bands in the same one-dimensional scan of the object to be imaged and/or inspected. The relative height or depth of the different images can be modified by simply adjusting the inclination between the confocal imaging system and a path followed by the object that is to be imaged and/or inspected during the one-dimensional scan. The optical confocal imaging system requires no moving parts and the only moving parts of the system are for motorized conveying of the object to be imaged and/or inspected along the path. In one arrangement of the confocal imaging system, color imaging and/or inspecting of the object can be performed. In another arrangement of the confocal imaging system, simultaneous brightfield and darkfield imaging and/or inspecting of an object can be performed.

37 Claims, 15 Drawing Sheets

FOREIGN PATENT DOCUMENTS

| | | | |
|---|---|---|---|
| 0172815 | 7/1991 | Japan | 250/201.3 |
| 0223709 | 10/1991 | Japan | 250/201.3 |
| 0440408 | 2/1992 | Japan | 250/201.3 |
| 128937 | 4/1968 | Switzerland . | |
| 128936 | 4/1988 | Switzerland . | |

OTHER PUBLICATIONS

IBM Technical Disclosure Bulletin, Confocal Microscope With Fabry–Perot Filter, vol. 31, No. 1, Jun. 1988.

Tandem Scanning Reflected Light Microscope, Kosik International, 1986, Product Bulletin.

M. Petran et al., The Tandem Scanning Reflected Light Microscope, RMS Proceedings, vol. 20/3, May 1985.

A Real–Time Confocal Laser Scanning Microscope (CLSM), The Netherlands (no date).

Donna Baranowski et al., Photothermal technique generates lens arrays, Laser Focus World, Nov. 1989.

IBM Technical Disclosure Bulletin, Mean Of Reducing The Image Acquisition Time In Optical Scanning Microscopes.

T. Wilson et al., Imaging In Scanning Microscopes With Slit–Shaped Detectors, The Royal Microscopical Society.

T. Wilson, Scanning Optical Microscopy, Scanning, vol. 7.2, 1985, pp. 79–87.

Borrelli et al., "Microlens arrays produced by photolytic techniques", Applied Optics, vol. 27, No. 3, 1 Feb. 1988, pp. 476–479.

Van der Voort et al., "Design & Use of a Computer Controlled Confocal Microscope for Biological Applications", *Scanning* vol. 7, 2(1985), pp. 66–78.

TANDEM LINEAR SCANNING CONFOCAL IMAGING SYSTEM WITH FOCAL VOLUMES AT DIFFERENT HEIGHTS

BACKGROUND OF THE INVENTION

1. Field of the Invention

The present invention generally relates to confocal imaging systems, and more specifically to tandem scanning in confocal optical microscopy to provide complete images and height measurements, and inspection.

2. General Description of Background

Recently, there has been an increased interest in the use of confocal optical microscopy, especially in the biological fields. In a conventional imaging system, when a part of an object to be imaged is axially displaced from the best focus, the image contrast decreases, but the brightness remains constant so that such displaced unfocused parts of the image interfere with the view of focused parts of the object. However, in a confocal imaging system the brightness of an object decreases rapidly with axial displacement from best focus so that substantially only focused parts of an object are visible.

In a conventional point-confocal microscope, light from a point source is focused within a very small space, known as a spot. The microscope focuses any light reflected or transmitted from the spot onto a point detector. In a reflecting point-confocal microscope the incident light is reflected by any object in the spot. Any light which is reflected by an object outside of the spot is not well focused onto the detector, thus it is spread out so the point detector receives only a small portion of such reflected light. In a transmitting point-confocal microscope, incident light is transmitted unless blocked by any opaque or semi-opaque item in the spot. A small item outside of the spot, whether in front of or behind the spot, will not block a significant amount of the transmitted light. But a larger item, either in front or behind the item in the spot, can block the light, thus preventing determination of the presence of the item in the spot. Generally, the point source and point detector are approximated by placing masks containing a pinhole in front of a conventional light source and conventional detector, respectively.

Similarly, in a conventional slit-confocal microscope system, light from a line source is focused into a very narrow elongate space, which is also known as a spot. The slit-confocal microscope focuses any light reflected or transmitted from the spot onto a line detector. The line source and line detector can be approximated using a mask with a slit in front of a conventional light source and row of conventional detectors, respectively. Alternately, a line source can be approximated by sweeping a focused laser beam across the object to be imaged or inspected.

Since only a small portion of the object is imaged by the confocal microscope, either the object to be imaged must be moved, or the source and detector must be moved, in order to obtain sufficient image data to produce a complete two-dimensional view of the object. Previously, slit-confocal systems have moved the object linearly in a direction perpendicular to the slit to obtain successive lines of image data. On the other hand, point-confocal systems having only one pinhole have to be moved in a two-dimensional manner in order to acquire two-dimensional image data. The raw image data are typically stored and later processed to form a full viewing image of a two-dimensional cross-section of the object that was inspected or imaged. In one previous system known as the Tandem Scanning Microscope, a spiral pattern of illumination and detector pinholes are etched into a Nipkow disk so, as the disk rotates, the entire stationary object is scanned. The Tandem Scanning Microscope allowed stationary objects to be viewed and photographed in real-time.

Application of confocal microscopes to inspection of electronics has been suggested in Zapf et al., *Microelectronic Engineering*, 5:573 (1986) and Lindow et al, *Micron and Submicron Integrated Circuit Metrology*, SPIE, vol. 565, p. 81 (1985). The axial discrimination provided by confocal systems may make them useful in the semiconductor manufacturing environment. For example, such systems could provide for improved inspection of height dependent features such as delamination, blisters, and thickness of structures and coatings. However, there are some problems associated with using confocal imaging systems for inspection of electronics. For example, single pinhole systems require too much time for scanning the object in two directions; optical systems for scanning a laser beam over the object are complex; and the spinning disk approach used in the previous Tandem Scanning Microscope resulted in alignment and maintenance problems. Thus, none of these systems can be configured for rapid and/or reliable application, especially in the field of inspection or imaging.

The number of different depth slices required (and therefore the amount of image data collected) depends upon the range of height that must be measured as well as the desired height resolution and performance of the optical system. For typical electronics inspection, images of 10 to 100 different depth slices would be required. Furthermore, data in several color bands may be required to differentiate materials. In previous confocal imaging systems, a separate scan was required for each desired elevation, and if data for multiple color bands was desired, then multiple scans at each elevation were required.

OBJECTS AND SUMMARY OF THE INVENTION

Basing in mind the problems and deficiencies of the prior art, following are some of the objects of the present invention, taken alone or in combination.

It is an object of this invention to provide a point-confocal imaging system capable of providing a complete image with one linear scan motion.

It is another object of this invention to provide a tandem point-confocal imaging system with a stationary pinhole mask.

It is another object of this invention to provide a source pinhole mask and a point detector array in a mirror-image skewed patterns which allow confocal imaging in pseudo-line-scan mode.

It is another object of this invention to provide efficient means for illuminating a scanned object through the pinhole mask in a confocal imaging system.

It is another object of this invention to provide an improved system for maintaining alignment between the pinhole mask and point sensor in a confocal imaging system.

It is another object of this invention to provide multiple depth images in a confocal imaging system with a single scan of inspected electronics or other objects.

It is another object of this invention to provide for simultaneous confocal imaging in multiple color bands.

It is yet another object of this invention to provide for darkfield confocal imaging.

It is another object of this invention to improve the optical efficiency of a confocal imaging system.

It is another object of this invention to provide a sensor array that does not require a sensor mask.

It is a further object of this invention to provide high data output rates of confocal images.

According to the invention, objects such as electronics to be inspected, are conveyed linearly in relation to a fixed confocal optical instrument with no moving parts. During a single direction scan of the inspected object, sufficient data are provided to produce full two-dimensional images of the object. Furthermore during the single scan, data are provided to produce multiple images at different depths in the object and/or images taken at different color spectra.

BRIEF DESCRIPTION OF THE DRAWINGS

The foregoing and other objects, aspects and advantages will be better understood from the following detailed description of the preferred embodiments of this invention with reference to the drawings, in which.

DETAILED DESCRIPTION OF SPECIFIC EMBODIMENTS OF THE INVENTION

Various embodiments of the present invention are depicted in FIGS. 1-19, in which like numerals refer to like features of the invention, but in which features are not necessarily drawn to each.

Figure 1:
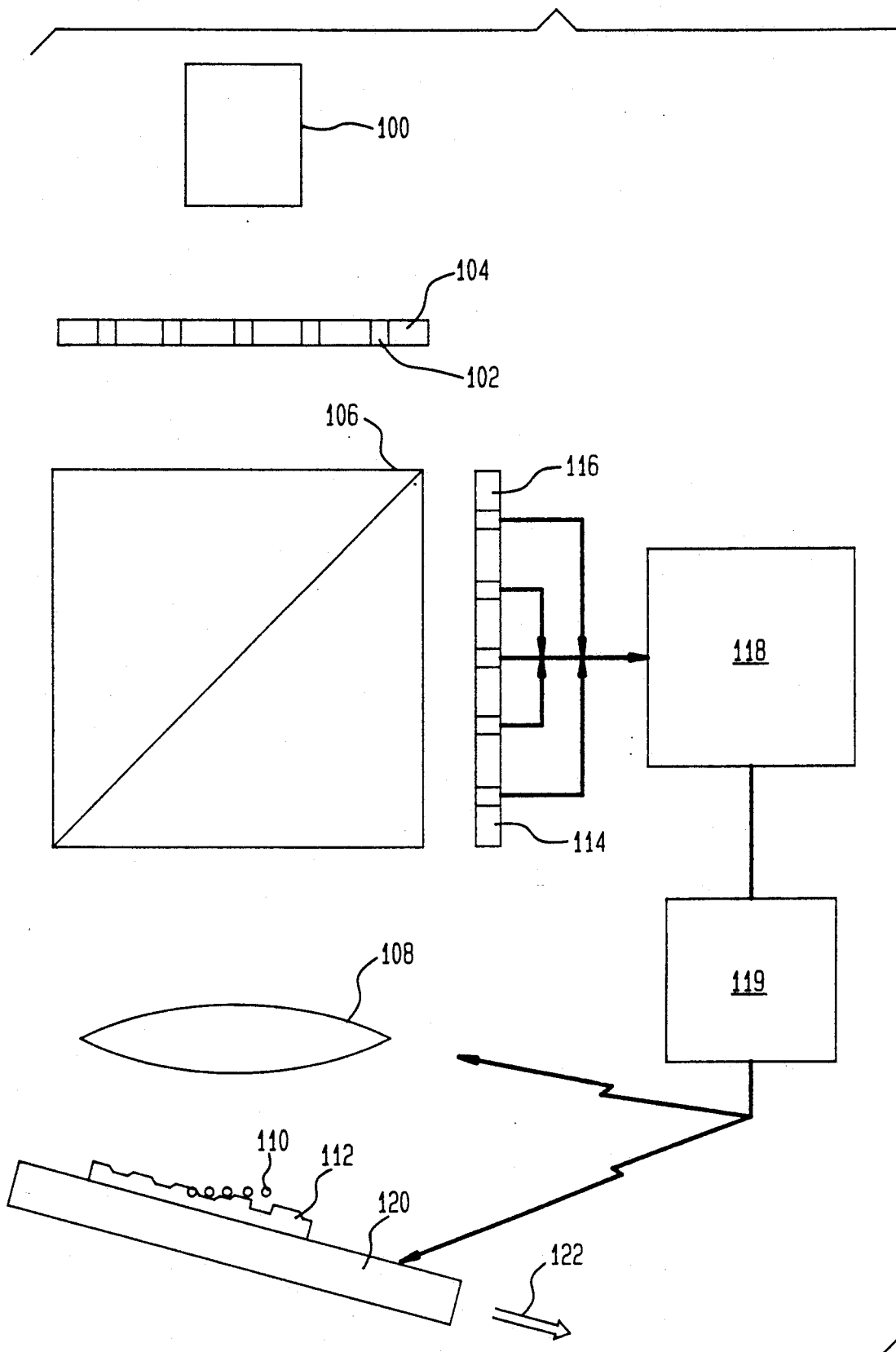
FIG. 1 is a block diagram of a specific embodiment of the imaging system of this invention with a reflecting microscope and a moving stage inclined in relation to a planar mask of the microscope.

Referring now to the drawings, and more particularly to FIG. 1, there is shown an imaging system in which illuminator 100 directs electromagnetic radiation, for example, light, x-rays, infra-red, to name a few, through a pattern of transparent apertures 102 in opaque source mask 104, and through beamsplitter 106 to optical lens system 108. The apertures 102 could be made of a transparent material or could be holes or openings in the source mask 104. Optical lens system 108 focuses the radiation from each aperture into a small separate focal volume 110 which may be a small point or line in space known as a spot. If a surface of object 112 is within a spot 110 the radiation is reflected back through lens 108. The lens 108, focuses the reflected radiation back through the beamsplitter 106 where a portion of the radiation is reflected to focus onto an optically aligned sensor array 116, having isolated pinpoint radiation sensors 114. Array 116 is a mirror image of the pattern of apertures 102 in source mask 104. Signals from the sensors 114 are directed to an electronic processor 118 which stores the data and arranges the data to generate full composite images of the object. If there is no surface in a spot, then substantially all the light of that spot, reflected by the object, will be scattered in the insensitive space between the pinpoint sensors 114 of sensor array 116. In order to minimize the reception of this stray radiation and crosstalk between spots, only a small fraction of the mask is transparent and only a corresponding small fraction of the area of array 116 is sensitive to radiation.

Stage 120 carries the object 112 in the direction indicated by arrow 122 which is inclined with respect to mask 104 and sensor array 116. Spots 110 are positioned at different depths in relation to the object 112 (i.e. at different perpendicular distances from stage 120). As the stage carries object 112 along the relatively inclined or tilted path, surfaces of the object at these different depths (different perpendicular distances above the stage), pass through the spots 110 and are detected. Thus, the instrument detects the topographical features of the object as it passes continuously along the relatively inclined path. This arrangement is especially useful for the inspection of objects for flaws, especially for electronics which often have flaws which can only be discriminated based on topography. Preferably thin film packaging would be inspected by the method of the invention using such a microscope of the invention.

Multiple confocal measurements at different heights can be used to calculate the height of any surface on object 112 relative to the optical lens system 108. The calculated height can then serve as an input to an autofocus subsystem 119. The autofocus subsystem 119 would be equipped with appropriate driving mechanisms (not shown), connected to either the lens 108 or the stage 120, so that the surface can be kept at the same reference position with respect to the optical system. In this way, an object 112 that is not perfectly flat can be kept within the measurement range. The global variations to the height of the object can be monitored by evaluating the driving signals to the autofocus 119 mechanisms.

Preferably, the apertures 102 in mask 104 are approximately the size of or smaller than the diffraction limit of the radiation and the apertures are separated from each other by at least several times the diffraction limit to minimize generation of stray radiation and cross talk between spots for best results. Preferably the sensors 114 of array 116 are isolated point detectors that sense the radiation in an area which is also approximately the size of or smaller than the diffraction limit of the radiation to efficiently gather the focused radiation while minimizing detection of stray or unfocused radiation.

For example, the diffraction limit of blue light with a wavelength of about 425 nm for a lens with a numerical aperture of 0.02 is approximately 20 μm, so that square pinholes of 10 μm * 10 μm would provide adequately small apertures for such lenses, an array of charge coupled devices (CCDs) which detect blue light in an area 10 μm or less across would provide an adequate sensor array 116, and if the pinholes were separated by 80 μm the percentage of unfocused or stray light detected would be adequately low (crosstalk will be about 1/64 of scattered light).

The pattern of apertures 102 in mask 104 and sensors 114 in array 116 is preferably selected so that as the object moves in relation to the mask, linearly across the spots 110, every point of the viewed surface of the object moves relatively through an illuminated spot. The view of the spots by the sensors is recorded, preferably each time the object travels a distance equal to the width of a projected spot and the recorded data are arranged by processor 118 to generate a complete image of object 112.

Figure 2:
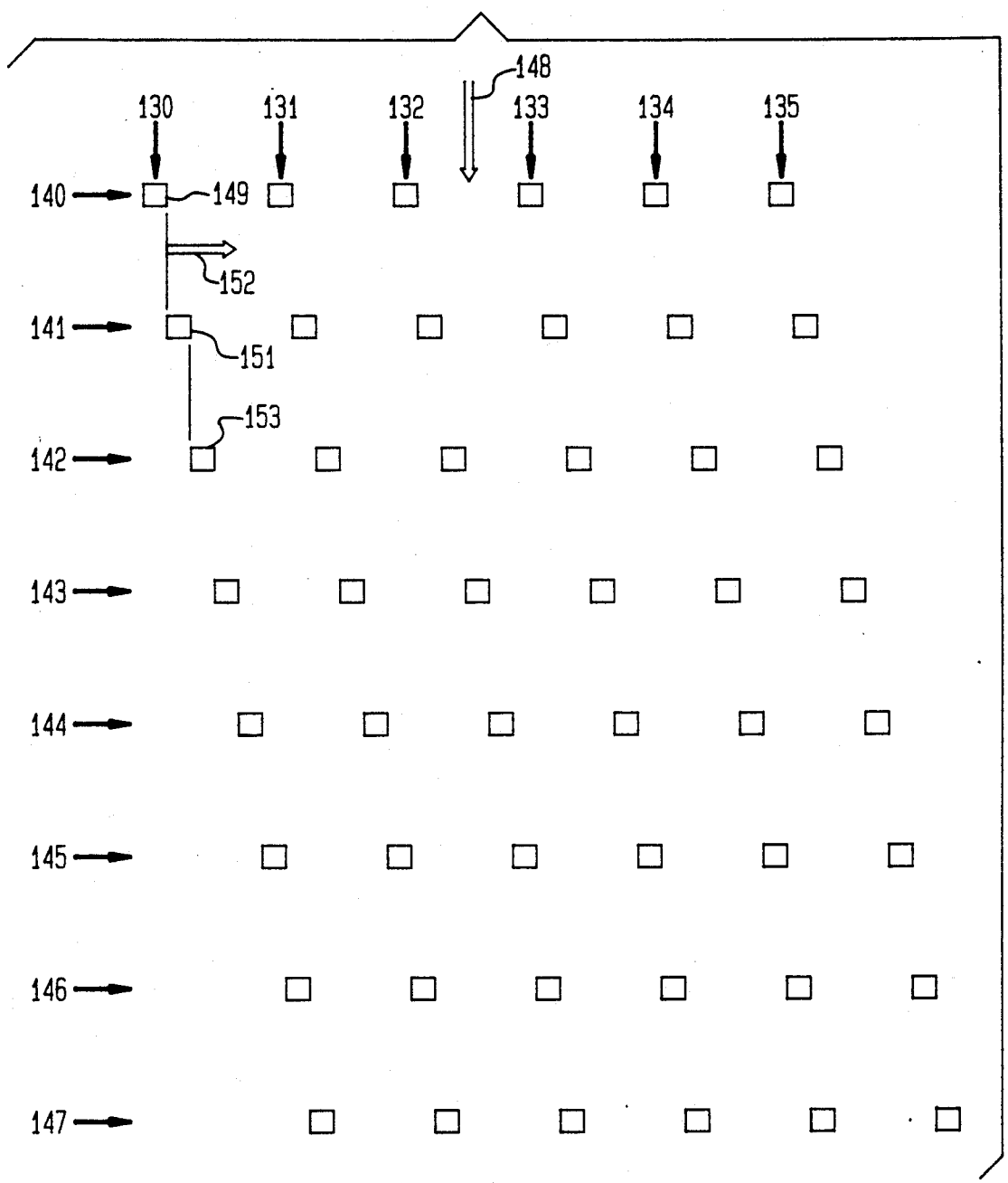
FIG. 2 shows a segment of a pinhole embodiment of the planar mask of FIG. 1 in which a matrix of pinholes in the mask are skew to the direction of travel of the inspected object.
Figure 3:
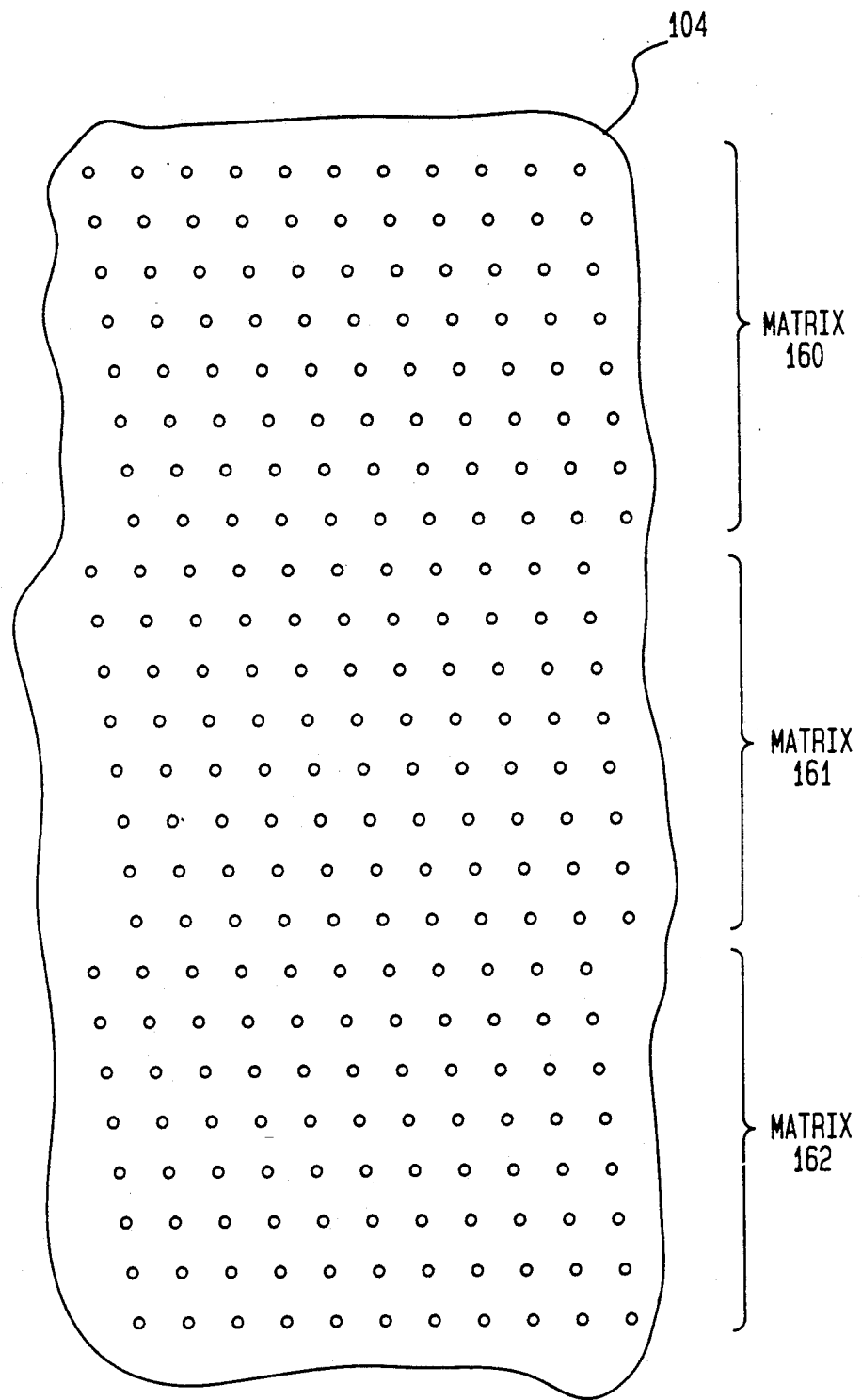
FIG. 3 shows another segment of the pinhole embodiment of the mask of FIG. 2, illustrating a plurality of the pinhole matrices, each matrix being positioned at a different distance from the inspected object for providing an image at a different depth of the object.

For example, FIGS. 2 and 3 illustrate a specific embodiment of the pattern of apertures 102 in masks 104 and sensor array 116 in which the apertures are compact transparent areas, in this case pinholes. The pinholes are arranged in array 116 with a pattern so that as the object moves in one direction across the illuminated spots every part of the top of object 112 will move through a spot. In FIG. 2, columns of pinholes 130-135 along each row are separated from each other, for example by 8 times the width of the pinholes. Similarly, rows of pinholes 140-147 along each column are each separated from each other, for example by 8 times the width of the pinholes. The pinholes in the rows 140-147, form a skew configuration in relation to the relative direction of object travel. The relative direction of travel of the object (not shown) is indicated by arrow 148 and the pinholes of each subsequent row 140-147 are offset by an additional distance of one pinhole width in the same direction which is perpendicular to the direction of object travel. For example, pinhole 151 is offset from pinhole 149 by one pinhole width in skew direction 152, and pinhole 153 is offset an additional one pinhole width in direction 152. Thus, the pinholes 149, 151, 153 in subsequent rows 140, 141, 142 scan adjacent parallel lines along the surface of the object in the relative direction of object travel; and when the object is linearly scanned once in relation to the matrix of pinholes of FIG. 2, every point of the viewed reflective surface of the object passes across one pinhole of the matrix; and sufficient information is obtained in one linear scan for generating a complete image of the object.

The pinhole offset need not be equal to the pinhole width. The pinholes may overlap to provide redundancy. Also, the pinholes could be arranged and recorded so that adjacent pixels in the image are not contiguous—only enough information would be gathered to identify critical features.

Only after the object to be imaged or inspected has been linearly scanned so that all the rows in a matrix have acquired image data from one row of the object, does the system acquire a complete line of image data for that particular row of the object. If the image processor 118 requires complete lines of image data, then the raw image data must be stored until complete lines of image data are available. For example, if each pinhole matrix contains 8 rows of pinholes where adjacent rows are separated by 8 pixel widths, then 57 rows of data must be stored to acquire complete lines of image data on the object. This is calculated, because, for example, after row 147, passes over a line on the object to be imaged or inspected, it will take 8 subsequent sensor readings before row 146 passes over the same line on the object. Therefore, it will take 7 times 8 additional sensor readings, plus the original sensor reading, to obtain all data for that particular line on the object. With reference to FIG. 2, the 8 rows of pinholes would be 140-147 and there would be 8 rows of pixel information recorded in the distance between each adjacent row of pinholes (e.g., 8 successive recordings are made as the object moves past the pinholes in a row). Thus, the system operates in a pseudo-line-scan mode.

In an example of a top sectional view of mask 104 shown in FIG. 3, each matrix 160, 161, 162 contains, for example, 8 rows of pinholes to provide sufficient data for generating a separate height slice image. Due to the relative inclination between the path of the object and the mask, each separate image displays the reflective surfaces of the object at a different corresponding depth (perpendicular distance from the stage). The difference in the depth of view between subsequent matrices should be selected so that all critical surfaces are imaged. This difference in depth of view between subsequent matrices can be modified simply by adjusting the relative inclination between the path of the object and mask 104 and sensor array 116.

In the embodiment of FIG. 1 in which a planar source mask 104 is inclined in relation to the linear path of the object 112, each subsequent row in each matrix 160, 161, 162 views a slightly different depth so that neighboring pixels in a row of unprocessed image data do not exactly represent a plane of the object. However, suitable processing of the image data may be used to generate planar images.

Also, in the relatively inclined system of FIG. 1, the illumination (not shown) is not perpendicular to the surface of object 112. This could lead to slightly asymmetric imaging of the edges of the object, and since most of the surfaces to be tested by the system are flat, shiny and parallel to the relative direction of object travel, the inclination could result in a loss of some of the light specularly reflected from the object.

Figure 4:
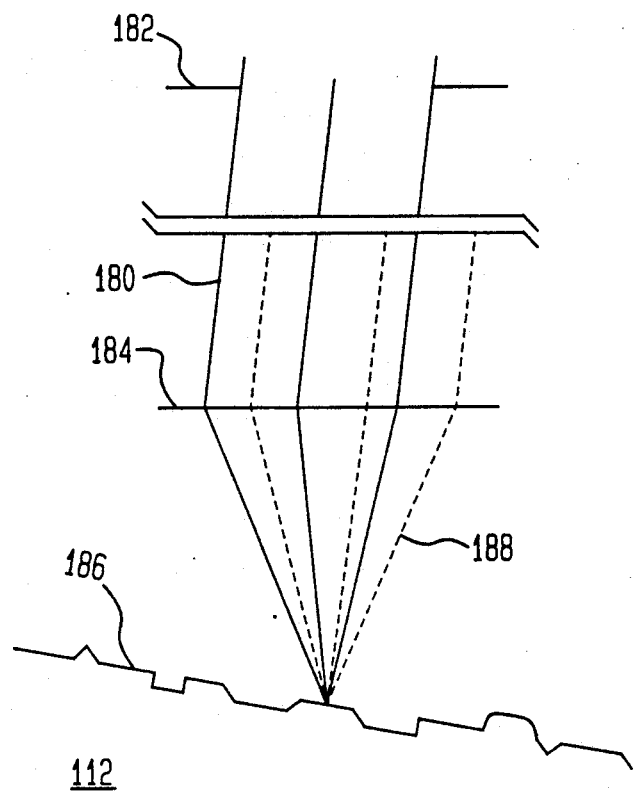
FIG. 4 is a schematic diagram illustrating point illumination and reflection from the relatively inclined object of FIG. 1.

For example, in FIG. 4 surface 186 is inclined in relation to the mask (104 in FIG. 1). In FIG. 4, illumination rays 180, pass through lens aperture stop 182 and are focused by lens 184 onto a relatively inclined surface 186 of the object 112. Reflected rays 188 do not travel in the same path as incident rays and will not be fully aligned with aperture stop 182.

Figure 5:
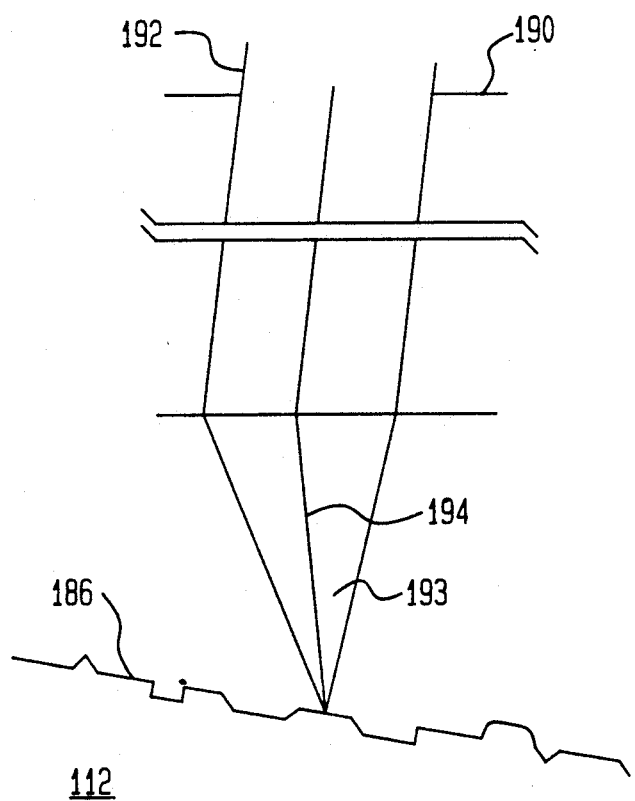
FIG. 5 is a schematic diagram illustrating correction of the point illumination for inclined object.

This asymmetry and loss of light is corrected in the invention as shown in FIG. 5 in which the lens aperture stop 190 is decentered so that illumination rays 192 are focused onto relatively inclined surface 186 with the chief arrays in a direction perpendicular to surface 186. The illumination cone 193 is then symmetric with respect to a line 194 which is perpendicular to the surface 186 and the specularly reflected rays all pass back along the same path as the illumination rays and back through lens aperture stop 190.

As another example, instead of a blue light, a green light could be used with this invention. The diffraction limit of green light, with a wavelength of about 578 nm for a lens with a numerical aperture of 0.02, is approximately 29 $\mu$m so that slits of 14 $\mu$m width would provide adequately small apertures for such lenses. A linear array of CCDs which detect green light in an area 14 $\mu$m or less across would provide an adequate sensor array 116. Preferably, the apertures should be separated by an even increment of the slit width, and if the slits were separated, for example, by 1,000 $\mu$m, the percentage of crosstalk due to detection of unfocused or stray light would be adequately low (average crosstalk will be much less than 14/1000).

Figure 6:
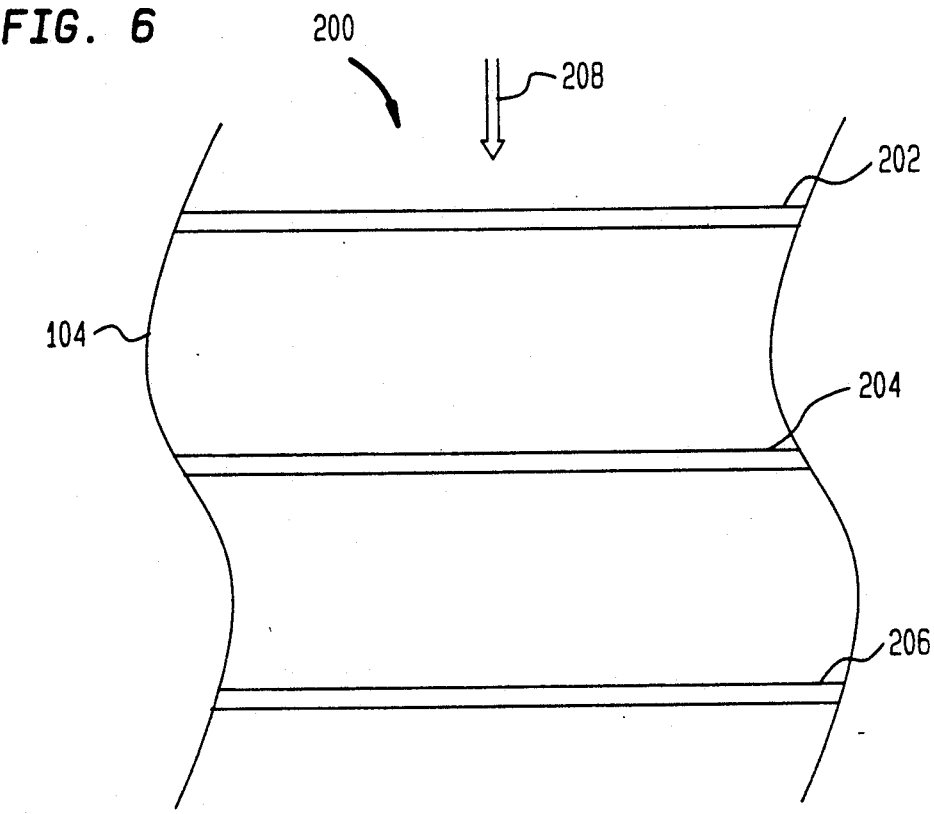
FIG. 6 shows a section of a slit embodiment of the planar mask of FIG. 1.

A sectional view of the pattern of slits 200 of the slit embodiment of mask 104 of FIG. 1 is illustrated in FIG. 6. Slits 202, 204, 206 each provide an entire line of image data to a mirror image set of rows of point detectors in detector array 116 of FIG. 1. As shown in FIG. 1, the mask is inclined relative to the object. With reference back to FIG. 6, similar to the rows of pinholes in the earliest mask, each slit is parallel to the plane of the object and perpendicular to the direction of travel of the object as indicated by arrow 208. Each subsequent slit in the direction of object travel is at a decreasing distance from the path of the object so that as the object travels across the slits, each slit provides sufficient image data to generate a complete image at a different elevation of the object for each image.

Figure 7:
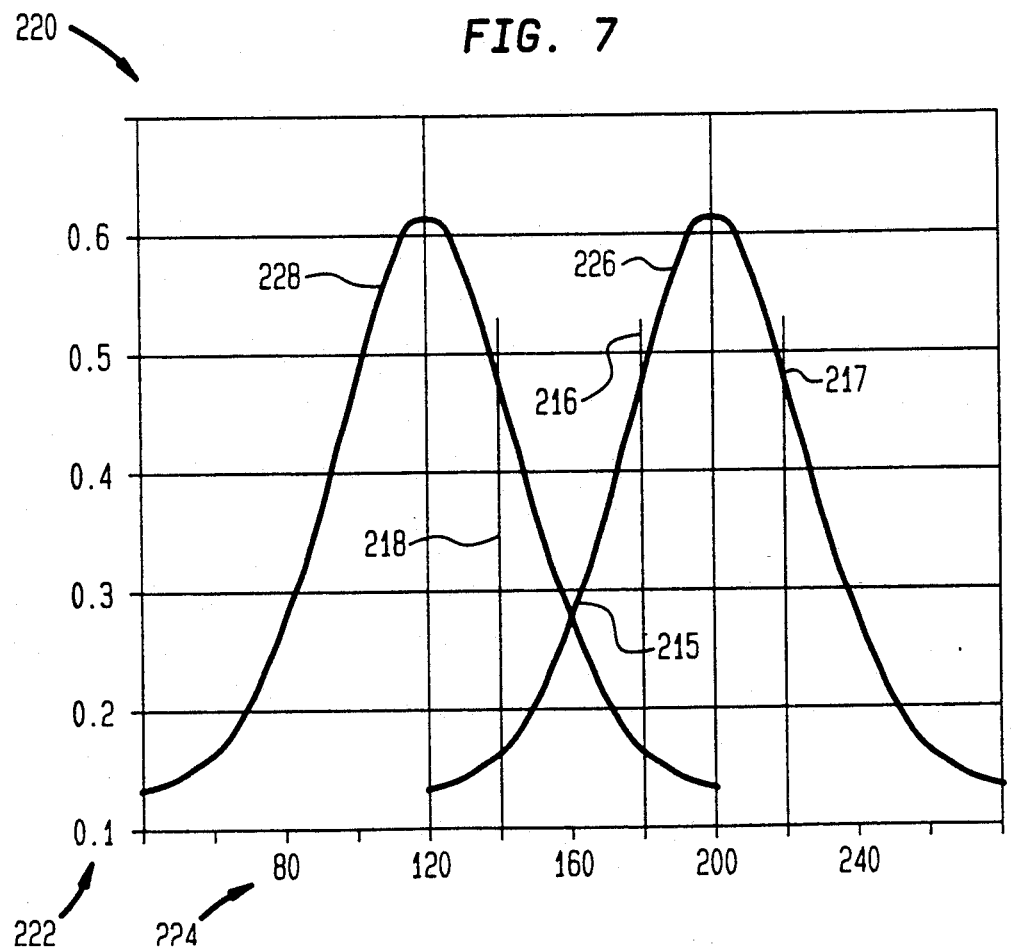
FIG. 7 is a graph illustrating the relation between signal level and height for the confocal slits of the mask of FIG. 6.

Graph 220 in FIG. 7 illustrates the depth response characteristic for typical slits 202, 204, 206 and the lens system 108. The depth response characteristic is the relation between intensity 222 measured along the vertical axis and depth or height 224 of the reflective surface measured along the horizontal axis. Specifically, the curves shown are for 0.1 numerical aperture (NA), 5X magnification, light in the 578 nm band, and with 14 $\mu$m wide slits and a mirror surface on the object. Curves 226, 228, etc., provide the relative intensity resulting from any surface within the ranges provided for corresponding slits 202, 204, etc.

It is a well known fact that, the depth discrimination sensitivity or depth resolution of slit-confocal microscopes is approximately 25% less than that of similar point-confocal microscopes, as measured by their full-width at half-maximum. At half intensity of about 0.3 the width of the curves in FIG. 7 are about 80 $\mu$m. In this case the relative inclination should position the slits at an axial separation of 80 $\mu$m to maximize the detectable height range. A single slit 202 could be used to determine height within a range of for example, 40 $\mu$m, i.e., from 160 $\mu$m to 200 $\mu$m or from 200 $\mu$m to 240 $\mu$m, etc. Using this method, it is not always possible to determine if the object's height was outside of the intended measuring range. For example, in using curve 226 to determine height of an object viewed through slit 202 between 160 $\mu$m and 200 $\mu$m, an intensity of 0.47 could correspond to either a height of 180 $\mu$m, as shown by line 216, or an out-of-range height of 220 $\mu$m, as shown by line 217. A second slit 204 could be used to determine if the height was outside the range for the first slit. For two slits positioned so that they are overlapping at their half maximum intensities 215, as shown in FIG. 7, height of a normal mirror surface can be determined unambiguously in a range of say 160 $\mu$m (from 80 $\mu$m to 240 $\mu$m). For example, a mirror surface providing an intensity of about 0.13 in slit 202 and about 0.61 in slit 204 would have a depth of 120 $\mu$m.

Images are acquired by scanning the object along a path and reading an output from each CCD sensor each time the object moves by one pixel width. For example, if the CCD pixels are 14 $\mu$m wide, then a 5X system requires data at every 2.8 $\mu$m of object travel. The image data from the detector row for slit 202 must be delayed until the arrival of data for the same line from the detector for slit 204 before processing to determine height data can commence.

Since the slits are separated by 80 $\mu$m in height and by 1,000 $\mu$m along the mask, the maximum relative inclination would be arcsin(80/1000)=4.6 degrees.

Figure 8:
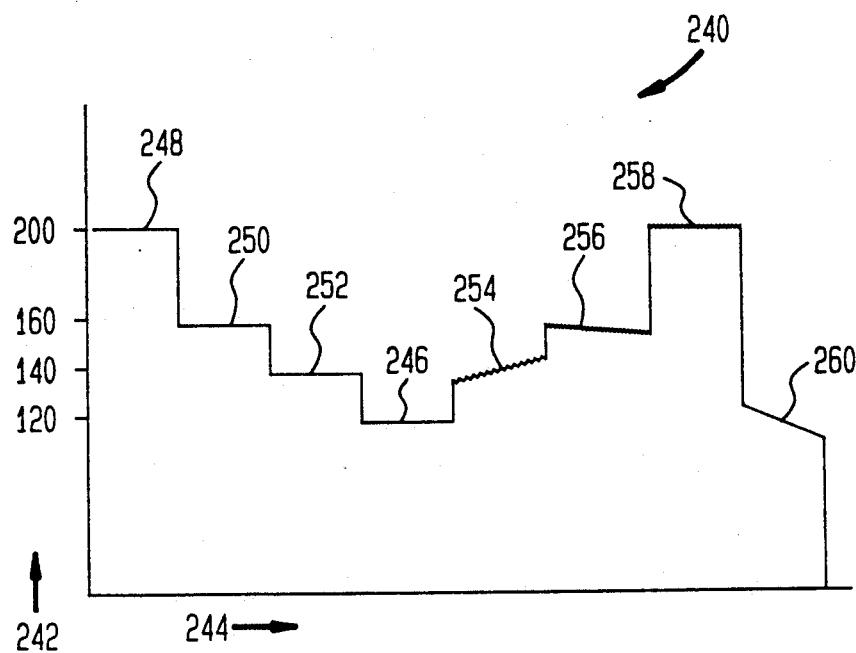
FIG. 8 is a graph of the height of object to be scanned.

Graph 240 in FIG. 8 illustrates a surface topography of an object with height of the reflective surface 242 along the vertical axis and relative position along the path of travel of the object in the horizontal axis. If all surfaces 246, 248, 250, 252 are substantially mirrors and the surfaces are perpendicular to the line of symmetry of the light cones, then according to graph 220 as the object is moved along the relatively inclined path, surface 248 at a height of 200 $\mu$m will be seen through slit 202 at the maximum intensity of 0.61 and through slit 204 at a minimal intensity of 0.13 according to curve 228 which results in an intensity ratio of 4.7. Similarly surface 246 at a height of 120 $\mu$m will by viewed through slit 202 at a minimal intensity and through slit 204 at maximum intensity which results in an intensity ratio of 0.21. Surface 250 at a height of 160 $\mu$m will be viewed through both slits with an apparent intensity of 0.3 which results in an intensity ratio of 1.0. Surface 252 at a height of 140 $\mu$m, as shown by line 218 in FIG. 7, will be viewed through slit 202 with an apparent intensity of approximately 0.17 and through slit 204 with an apparent intensity of approximately 0.50 which results in an intensity ratio of 0.34. In this case the height of each surface of the object can be found from the graph 220 in FIG. 7 or from a graph plotting the ratio against height. The height measurement range can be extended indefinitely in 80 $\mu$m increments by adding additional slits such as 206.

Even if the surfaces are not parallel and/or the surfaces have different reflectance as shown in FIG. 8 for surfaces 254, 256, 258, 260, the height of the surfaces can be determined from the intensity ratios. The intensity ratios can for example be an index into a look-up table (not shown). A look-up table is typically a table where pre-computed information is stored for easy retrieval. For example, if the intensity ratio for slits 202, 204 is 0.31, then using a look-up table the height can be determined to be approximately 140 μm.

Figure 9:
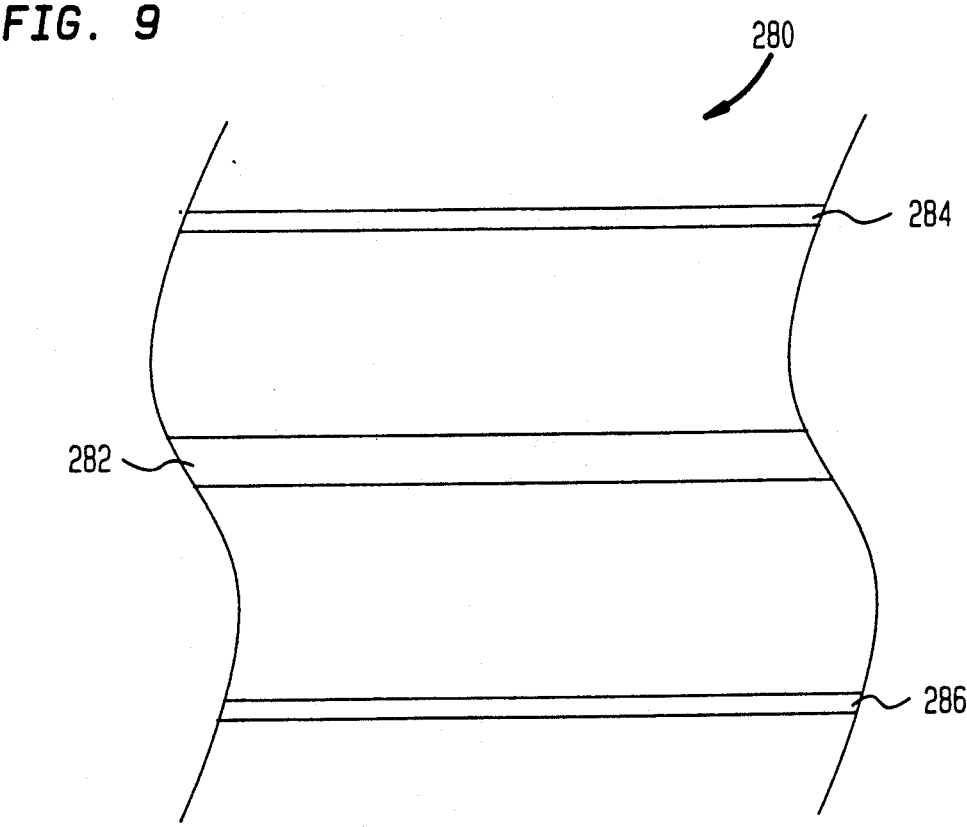
FIG. 9 is another slit embodiment of the planar mask of FIG. 1, with a part of the mask dedicated to conventional imaging.

As an alternative means for determining height, a segment 280 of mask 104 showing another embodiment of the aperture pattern 102 of mask 104 is provided in FIG. 9. In segment 280 of mask 104 a wide gap slit 282 is provided between confocal slits 284, 286 to provide a window for conventional microscopy. The width of gap for the wide gap slit 282 is selected to provide a slightly unfocused conventional view (not a confocal view) of any surface in the desired range of heights without any substantial loss of intensity. Such a conventional view allows the intensity of reflectance of any surface within the range to be directly measured so that relative intensities measured through the slits 284, 286 can be compared to the actual intensity to directly determine the height of the surface from an appropriately scaled graph 220 in FIG. 7. Preferably, relative intensity ratio of the two confocal slits would be used as an index into a look-up table specific for the measured actual surface intensity to determine the height.

In an alternative slit confocal system, a laser spot could be scanned across the width of a slit.

In FIG. 1, optical alignment of transparent apertures 102 of mask 104 with the sensor array 116 is critical to the performance of the imaging system. Generally an alignment to one-tenth the width of an aperture is satisfactory, and it is important that the alignment be stable and not drift during operation.

Figure 10:
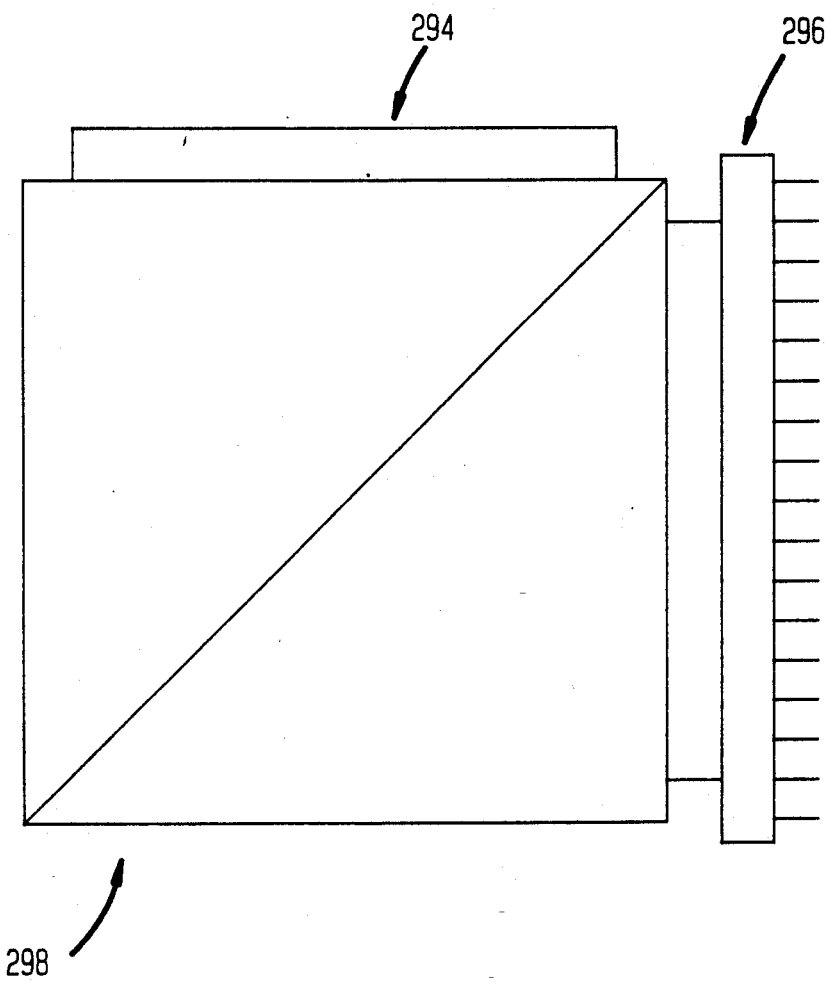
FIG. 10 is a block diagram of a specific embodiment for aligning the mask and the sensor array of this invention.

FIG. 10 shows a preferred arrangement for obtaining and maintaining alignment in the imaging system of FIG. 1. As shown in FIG. 10, the source mask 294 and the sensor array 296 are connected directly to a solid beamsplitter cube 298. Preferably after alignment of the transparent source apertures 102 with the corresponding radiation sensors 114 has been performed, the source mask 294 and sensor array 296 are adhered or secured, such as by cement, to beamsplitter cube 298, resulting in an assembly that is very rigid and insensitive to temperature changes and mechanical disturbances.

Figure 11:
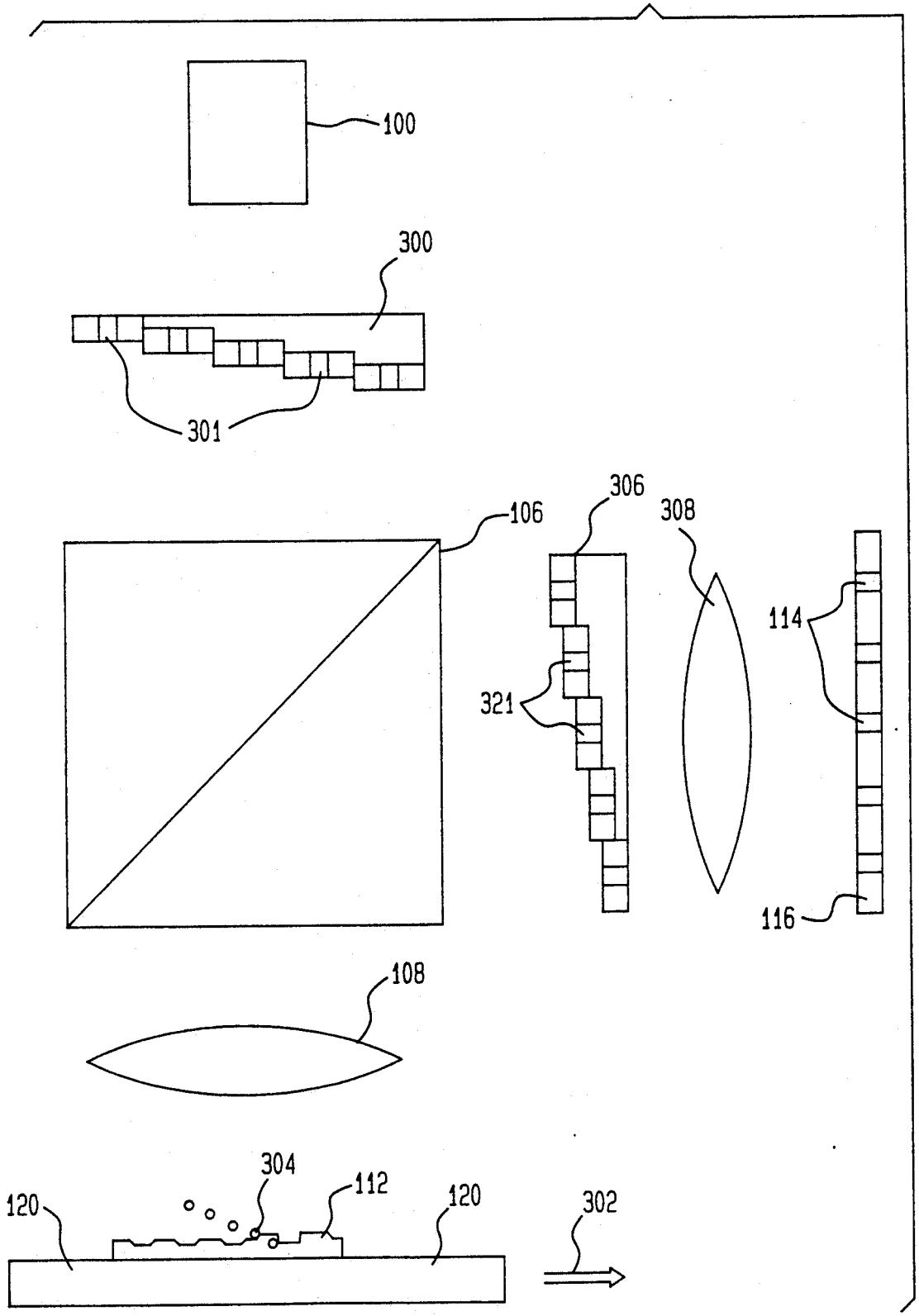
FIG. 11 is a block diagram of another embodiment of this invention similar to the embodiment of FIG. 1, with two stepped masks—an illumination mask parallel and a sensor mask perpendicular to the stage.

FIG. 11 illustrates an alternative embodiment of the imaging system of this invention in which source mask 300 is parallel to the direction of predominantly linear movement of the object 112 and stage 114, as indicated by arrow 302. Radiation is directed by illuminator 100 through the source mask 300 having a stepped opaque surface with a pattern of pinhole apertures or slits 301. Each step of the mask contains one of the matrices of the pattern of apertures, as shown in FIGS. 2 and 3 or slits as shown in FIGS. 6 or 9. Therefore, the spots 304 formed by different steps are projected at different depths of object 112. Thus, the instrument detects the topographical features of the object as it passes approximately linearly along a relatively non-inclined path.

A stepped sensor array is not commercially available; therefore, a sensor mask 306 which is a mirror image of source mask 300, and a focusing lens 308 are provided. The reflected rays are deflected by the beamsplitter 106 through an optically aligned sensor mask 306 having steps with aperture matrices which are a mirror image of the pattern of the source mask. The rays are focused by lens 308 onto the sensor array 116. Signals from the sensor array 116 are directed to an electronic processor 118 as shown in FIG. 1 and arranged to form images as described above.

Instead of using lens 308 to focus the rays onto the sensor array 116, one could enlarge the individual sensor areas 114 on array 116 behind each of the pinhole apertures 321 in sensor mask 306 so that all the light passing through the pinholes 321 are detected by the corresponding sensor areas 114, in spite of the larger blur circle of those pinholes 321 that are out of focus as a result of the removal of focusing lens 308. Alternatively, the sensor array 116 could be tilted to approximately match the effective slope of the stepped mask 306. This would reduce the amount of defocus and, therefore, reduce the degree of enlargement needed for sensor areas 114. However, it is noted that tilting the sensor array 116 would require a change in the sensor geometry (elongation along one axis) in order for the sensing regions to match the pinhole patterns.

In the case of slit apertures, it is not necessary to use stepped masks. Tilted masks will suffice because unlike the pinhole masks of FIGS. 2 and 3, each slit of a slit mask provides a confocal image that is representative of a truly planar focal region. Consequently the extra lens 308 would not be necessary, and both the mask and sensor array could be tilted with respect to the object.

Advantageously in the case of a pinhole source mask 300, used in the stepped mask embodiment of FIG. 11, illuminating rays are directed onto the object 112 in a direction perpendicular to the stage 120; therefore, asymmetry of edges and loss of specularly reflected light is prevented without decentering of the lens aperture stop as described above in reference to FIG. 4. Furthermore, all the pixels of raw image data for each slit or matrix of pinholes represents information at the same depth so image processing steps are simplified.

The relative depth of the surface of the object viewed by each subsequent step of the sensor mask 306 can be adjusted by replacing both source and sensor masks in which case the source mask 300 and the sensor mask 306 cannot be adhered or secured to the beamsplitter cube 106 as described above.

If the source mask 300 and the sensor mask 306 are adhered or secured to the beamsplitter cube 106, then the depths of each slit or matrix of pinholes can be adjusted by tilting the confocal imaging system except the stage 120 in relation to the object or stage path 302 as in the planar mask embodiment of FIG. 1. If a pinhole pattern, for example as shown in FIGS. 2 or 3, is used, then additional image processing steps similar to those described in reference to FIG. 1 would need to be implemented.

The simplest embodiment of an illuminator 100, shown in FIGS. 1 and 11 would be a single illumination source (not shown) which is positioned to direct radiation toward the source pinhole mask.

Figure 12:
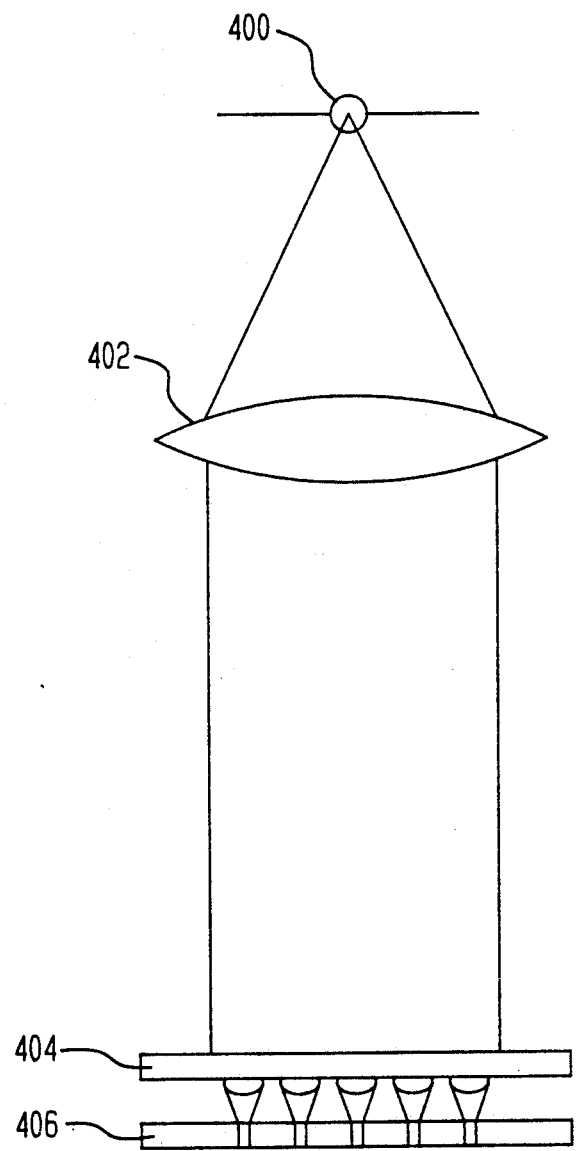
FIG. 12 is a block diagram of a specific embodiment of the illuminator of this invention which provides for efficient illumination.

FIG. 12 illustrates a more efficient embodiment of an illuminator 100 in which radiation from a source 400 is collected by a condenser 402 and focused by an array of lenses 404 and directed through transparent apertures (which could be pinholes or slits) in a planar source mask 406.

Figure 13:
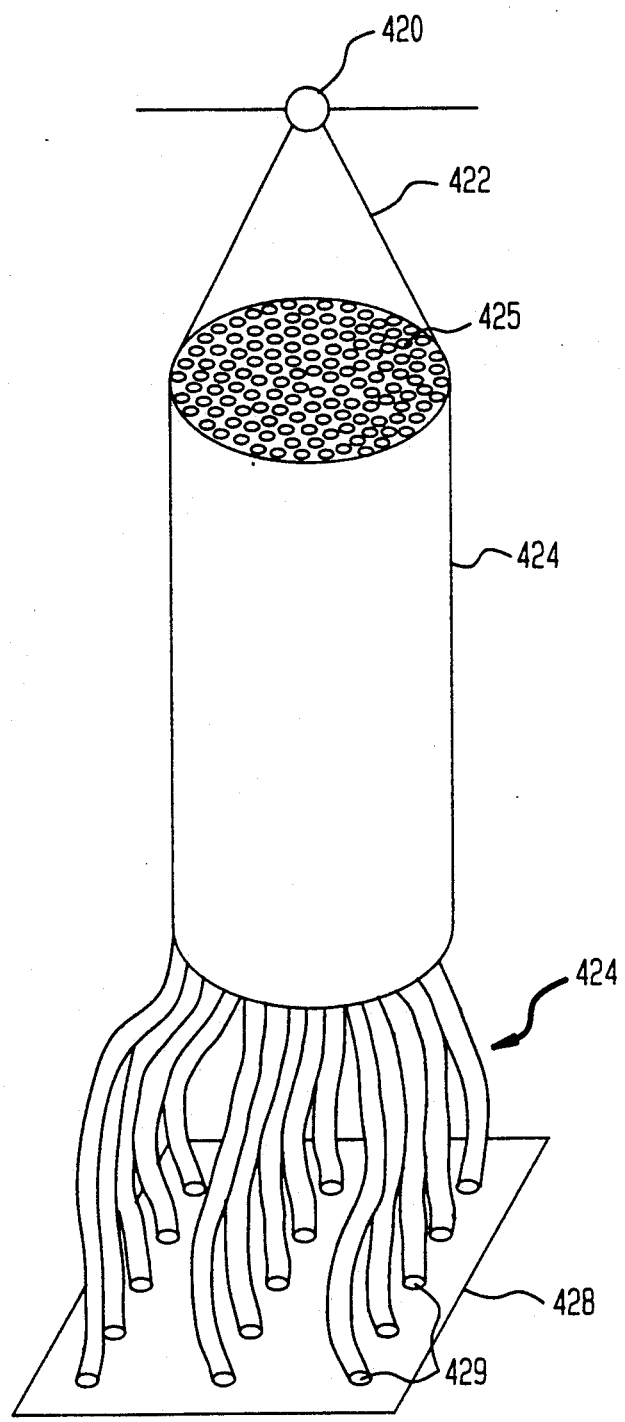
FIG. 13 is a block diagram of another specific embodiment of the illuminator of this invention which provides efficient illumination.

FIG. 13 illustrates a second embodiment of a more efficient illuminator 100 in which radiation source 420 directs radiation 422 into one end of a bundle 424 of radiation guides or optical fibers 425 which flare out at 426 and are positioned to align with pinholes 429 in the source mask 428.

If the diameters of the radiation transmitting cores of the fibers 425 are approximately the diffraction limit or less of the lens 108, then the source mask 428 can be replaced by a positioner to maintain the axial and lateral position of the fiber 425 ends. A positioner is a fixture that replaces the source mask 428 and holds the optical fibers 425 such that the ends of the optical fibers are all in the desired axial and lateral alignment. For example, an electric light bulb may be used as a radiation source and is positioned such that the optical fiber ends provide an array of point sources in a plane or in steps.

Polarization can be used to further increase the radiometric efficiency of the system and to improve the resulting image. In the systems of FIGS. 1 and 11, the radiation rays pass through the beamsplitter twice. Half the light is lost each time the light is transmitted through the beamsplitter. Therefore, at the most, one quarter of the light is received at the radiation sensor 114. But, with polarization, half of the light will be lost by the initial linear polarization, while the polarizing beamsplitter will transmit substantially all the light passing through it.

Figure 14:
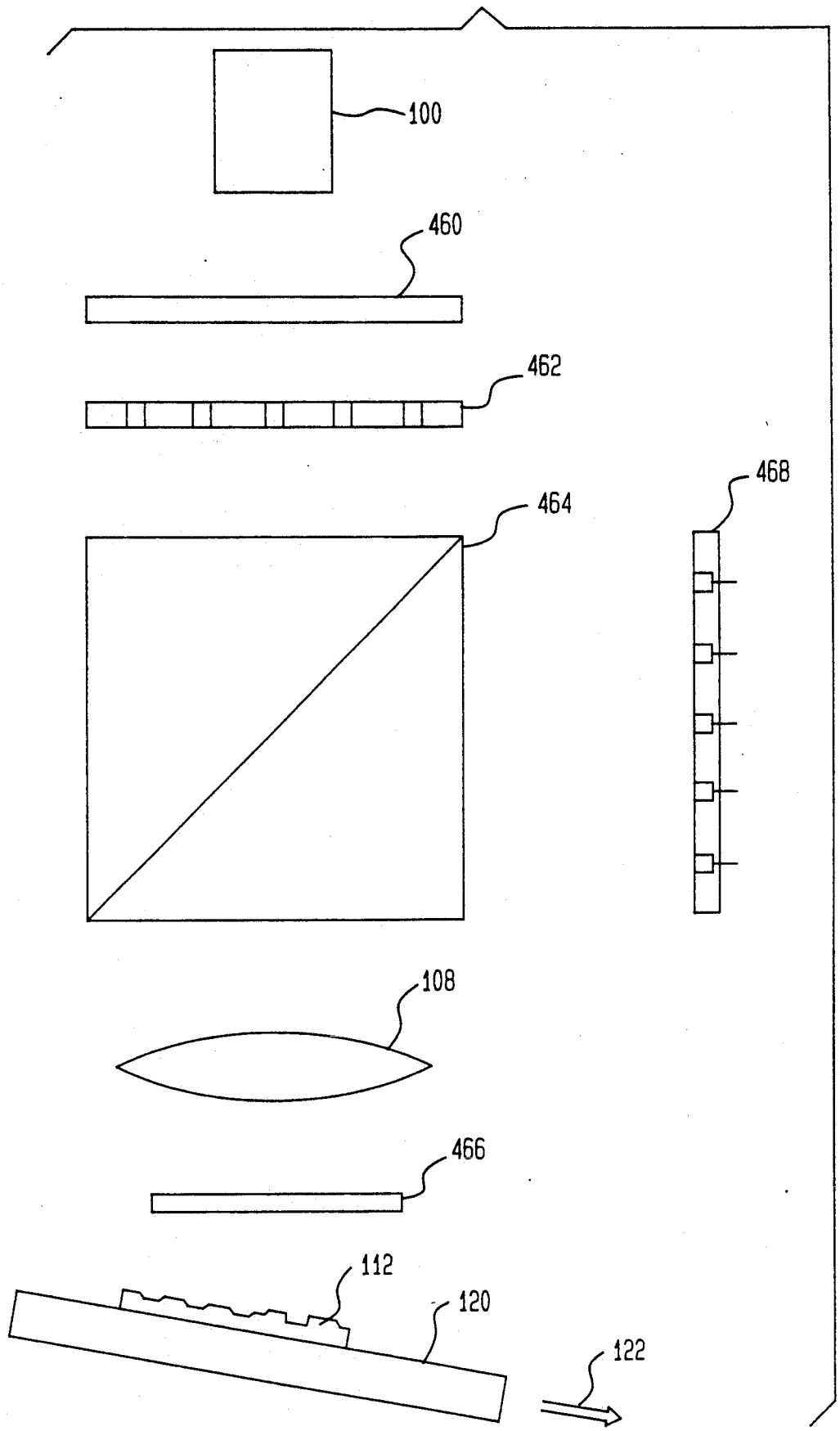
FIG. 14 is a block diagram of a specific embodiment of a polarizer arrangement of this invention to increase the radiometric efficiency of the system.

FIG. 14 shows a specific embodiment of a polarizer system of this invention. Polarizer 460 linearly polarizes the radiation directed from the illuminator 100 to polarized beamsplitter 464 which is oriented with respect to linear polarizer 460 so as to transmit substantially all the remaining illumination through the beamsplitter. After being focused by lens 108, the rays are converted to circularly polarized radiation by a quarter wave plate 466 and projected onto the object 112. The rays reflected by the object 112 are converted by quarter wave plate 466 back into linearly polarized light, but it is now rotated 90 degrees with respect to the linearly polarized illumination so that the polarized beamsplitter 464 directs substantially all of the light reflected from the object 112 toward sensor array 468.

Furthermore, the small fraction of light reflected upward from lens 108 and from wave plate 466 will travel straight back through the beamsplitter and therefore, will not be directed to the sensor array 468.

Waveplate 466 is shown between lens 108 and object 112, but may be positioned between polarized beamsplitter 464 and lens 108, or it could be a part of the lens 108. Polarizer 460 is shown between the illuminator 100 and source mask 462, but may be positioned after the mask. Mask 462 may be a single planar or a stepped mask or an optic fiber positioner. Sensor array 468 may be a planar array, but may also include a stepped pinhole sensor mask 306 and sensing lens 308 as shown in FIG. 11.

Figure 15:
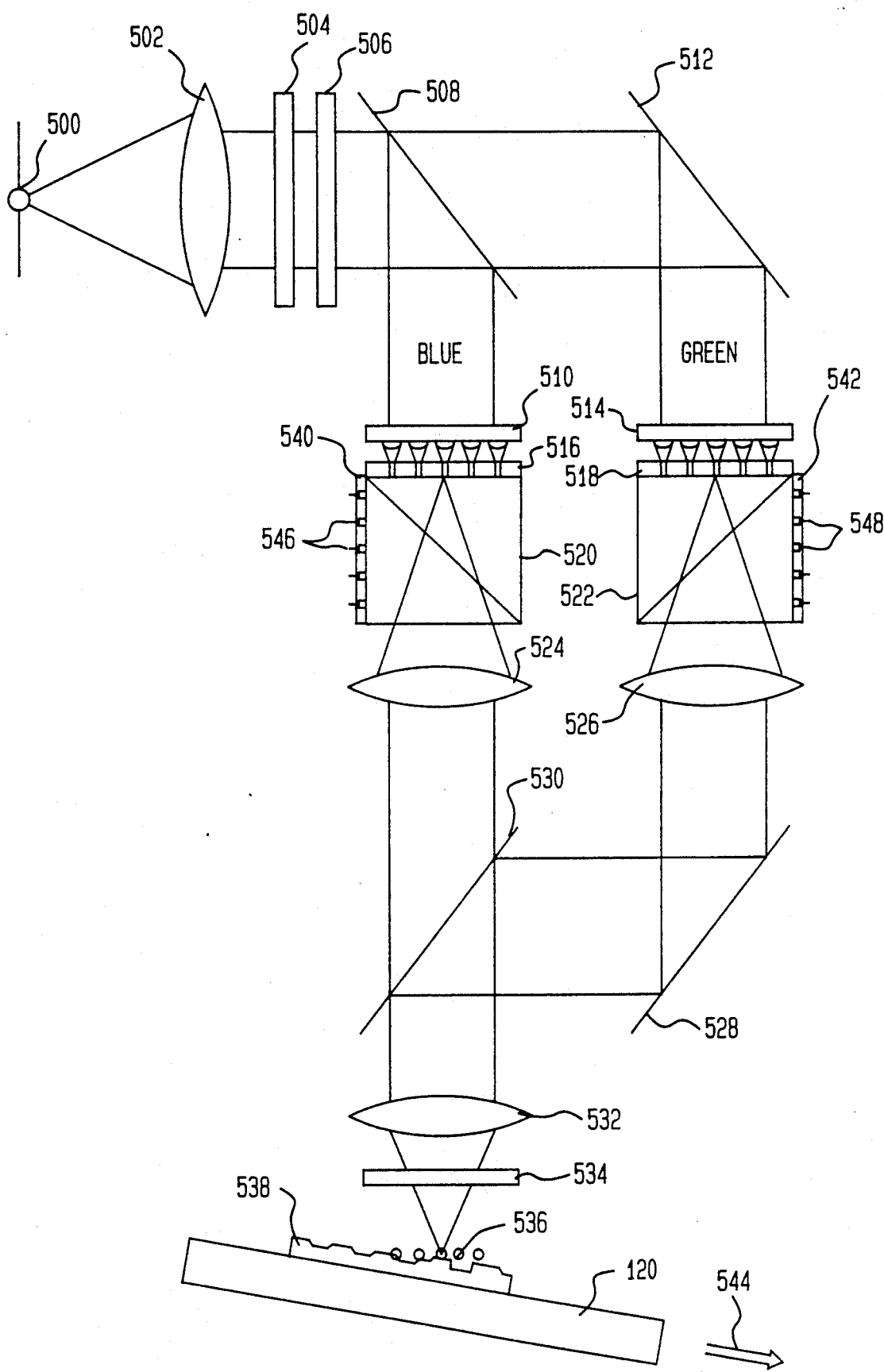
FIG. 15 is a block diagram of an embodiment of this invention for producing images taken in two different spectral bands.

FIG. 15 illustrates another embodiment of this invention for providing color images. For example, it separates the images in two spectral bands at wavelength ranges, such as, 400-450 nm (blue) and 540-580 nm (green), to aid in the imaging and/or inspection, for example, of thin film electronic packaging, conductive paste patterns on greensheets, disk heads, and similar such objects. As shown in FIG. 15, incoherent light from lamp 500, typically a 5 kW mercury-arc lamp 500, is collected by a glass condenser lens 502 and directed horizontally through a light filter 504 to remove heat and ultraviolet radiation. The light passes through linear polarizer 506 and is split into two color bands by dichromatic mirror 508. The dichromatic mirror 508 directs the blue light vertically down to lens array 510 and allows the green light to pass to the mirror 512. Mirror 512 directs the green light vertically down to lens array 514.

Lens arrays 510, 514 are close-packed arrays of micro-lenses in a single horizontally oriented substrate. Such lenses are commercially available from Fotoform Products Group, Corning Inc., Corning, New York 14831 or from Adaptive Optics Associates, Inc., United Technologies Optical Systems, 54 CambridgePark Drive, Cambridge Mass. 02140.

Respectively, lens arrays 510, 514 focus the blue and green light rays through corresponding arrays of pinholes in horizontal pinhole masks 516, 518, and down through polarizing beamsplitters 520, 522, and the light is collected by condensing lenses 524, 526. Mirror 528 reflects the green light horizontally to dichromatic mirror 530 where the green and blue light rays are recombined into a single beam directed vertically downward. The combined beam coming from the dichromatic mirror 530 is focused by lens 532 down through a quarter-wave plate 534 to circularly polarize the light and into an array of focal points or spots 536 within a horizontal plane. The spots 536 correspond to the pinholes in the pinhole masks 510, 514.

Any reflective surface on the top of object 538 within one of the spots 536 reflects light upward which can be detected by the system. The object 538 is carried by a motor driven stage 120 along an approximately linear path inclined in relation to the pinhole masks in direction 544. As the object 538 travels, it is scanned by the spots 536 to provide topographical information about the object 538. This invention allows the topography of the top surface, as well as internal structures covered by layers which are transparent to light, such as polyimide, to be analyzed.

The reflected light rays are directed through quarter-wave plate 534 and made linearly polarized again so that they will be efficiently directed by polarized beamsplitters and dichromatic mirrors. The reflected rays are then collected by lens 532 and directed to dichromatic mirror 530 which separates the blue and green light rays by allowing the blue light to pass upwardly and reflecting the green light horizontally to mirror 528. Respectively, the blue and green light rays are focused by lenses 524, 526 upward through polarized beamsplitters 520, 522 which reflect the beams horizontally to focus onto sensor arrays 540, 542.

Advantageously, there are no moving parts in the optical instrument, and the only moving parts of the system are for moving the stage which carries the object to be inspected.

Each pinhole mask 516, 518 and sensor array 540, 542 are aligned to within 1 μm and can be secured, such as by cementing, to the respective beamsplitter cube 520, 522 to form an assembly for maintaining alignment. The two assemblies are aligned to ensure that the green and blue color images overlay well. To improve alignment stability, a clear spacer (not shown) may be secured, such as by cementing, respectively between each lens array 510, 514 and pinhole mask 516, 518.

For example, the masks 516, 518 that are used for this embodiment are typically evaporated chrome-on-glass masks and the pinholes are typically 10 μm square apertures arranged in a pattern similar to that shown in FIGS. 2 and 3. These masks 516, 518 could have 16 matrices of 8 rows each, resulting in 128 rows of pinholes, and each of these rows could have 256 pinholes extending perpendicular to the direction of travel 544 of the object 538. The pinholes of each subsequent row within each matrix are preferably offset 10 μm in the direction of row length. The pinholes preferably are on 80 μm centers and the rows preferably are separated by a distance of 80 μm. Each of 16 matrices per mask 516, 518 consist of 8 rows which are sufficient for producing an entire separate image of one height slice of the object being scanned. Each height slice image is obtained using 8 rows of 256 pinholes, resulting in an image that is 8*256, or 2048 pixels wide. For each color, 16 images are produced of the object 538, simultaneously. Each of the 16 images forms a cross-section at a different height of the object 538 as described above in relation to FIGS. 2, 3, and 6. It is obvious that the multiple color imaging should be done at the same height and lateral positions.

The lens arrays 510, 514 have the same pattern as the pinholes in masks 516, 518, respectively, as discussed earlier.

In order for the preprocessor to output lines of data and operate in a pseudo-line-scan mode, for example, for each 8-bit data, for each of the 8 rows of each matrix in each color has to be stored. Since each row contains 256 pinholes, therefore, one would need 65,536 8-bit image data storage locations.

For example, the lenses 524, 526 and 532, could have 0.4 numerical aperture on the object side, and could be selected to produce a 1:10 reduction. Therefore, for a 10 μm pinhole masks 516, 518, the spots are reduced to 1 μm in size, and thus the field of vision is 2048 μm across.

Typically, the angle of inclination of the object path is 1.8 degrees which corresponds to a difference of 2 μm between image planes and a total depth range of 30 μm. Tight distortion and telecentricity specifications are required in order that the 16 images in both color bands be accurately registered with each other.

Each sensor array 540, 542 can be a customized self-scanned array of 32,768 (32K) CCD elements in a pattern which is a mirror image of the pattern of pinholes in masks 516, 518. Each of the sensor elements 546, 548 register light within an area approximately 10 μm across which corresponds to the size of the illumination pinholes of the source masks 516, 518 The maximum continuous scan rate of the object is normally 25 mm/sec; therefore, for a 1 μm pixel area at the object 538, each pixel is sampled at a rate of 25,000/sec. Each sensor array normally has 64 output taps, each capable of a video rate of 12.5 Mpixels/sec. Therefore, each sensor array provides 800 Mpixels/sec of, for example, eight-bit image data.

The electronic processor 118, as shown in FIG. 1 and discussed above, collects data from all sensor arrays. The processor 118 could perform data smoothing and could produce height and extended focus images. For example, at an input data rate of 1.6 Gpixels/sec for two colors, the processor 118, could produce topographically indicative color output at a rate of 50 Mpixels/sec.

Alternately, the confocal imaging system of FIG. 15, constructed using the slit mask of FIG. 9, and using a 1×2048 pixel self-scanned CCD array, such as the IL-C4-2048, CCD arrays made by Dalsa, Inc. This CCD array has 14 μm pixels. For example, to obtain a 2.8 μm resolution image of a 6 mm wide object 538, and a height range of 50 μm, a standard 5X magnification lens with a numerical aperture (NA) of 0.1 microscope objective could be used in the confocal imaging system of FIG. 15. Making the two confocal slits 284 and 286 14 μm wide by 30 mm long, one could provide sufficient height discrimination and field of view. The conventional window or oxide gap slit 282 could be 200 μm wide by 30 mm long to provide at least a 50 μm height range, where the loss of signal due to defocus is negligible. The separation between confocal slits 284, 286 and the conventional window 282 could be about 1000 μm so there is little crosstalk between the detection channels. Since the height range for this example is 50 μm, the slits 284, 286 should be axially offset by at least 25 μm at the object so that the slits focus at different height planes. The distance between confocal slits is 2000 μm thus, the path of the object must be relatively inclined by at least arcsin(25/2000)=0.72 degrees.

Figure 16:
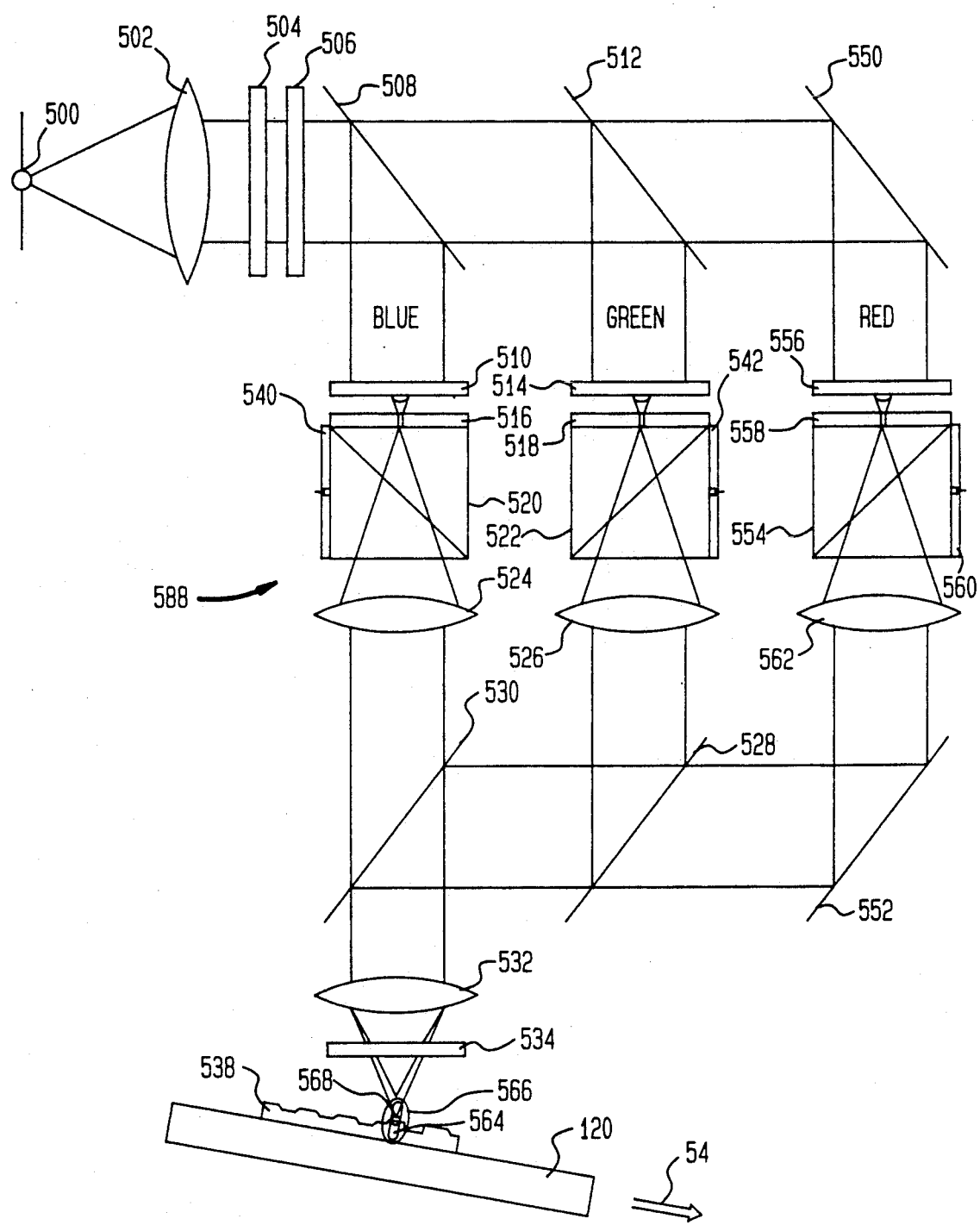
FIG. 16 is a block diagram of an embodiment of this invention for producing images taken in three different spectral bands, with each spot projected at the same horizontal coordinates at different heights.

In a slit confocal system 588 of FIG. 16, another color band is added by providing an additional pair of dichromatic mirrors 550, 552, polarizing beamsplitter cube 554, lens array 556, source mask 558, sensor or detector array 560, and condensing lens 562 in order to provide images in three colors produced simultaneously. Each of the three beamsplitter cubes or blocks 520, 522, 554 can be positioned at a slightly different vertical position, and overlapping focal volumes 568, 564, 566 for each color can be at different heights at the same horizontal location on the object. The three focal volumes 568, 564, 566 are not required to be at different heights. Instead of forming images at three different height planes, the focal volumes 568, 564, 566 could also form color images of the same volume at one height. Or, two wavelengths could be used to form a color brightfield image of the same volume, while a third wavelength could be used to form a darkfield image of that same volume.

As described in relation to FIG. 9 above for a slit-confocal system, data produced using only two confocal slits and one extended focus window are required to determine height within a wide range. Each source mask 516, 518, 558 has a single aperture, and each detector array 540, 542, 560 has a single detector row of CCD's. The image data for all three detector arrays would be simultaneously received by processor 118 of FIG. 1, which would simplify processing and eliminate image data storage requirements. Overlapping focal volumes 568, 564 are each produced by a single slit aperture in masks 516, 558 respectively. Conventional focal volume 566 is produced by a window in mask 518. Focal volume 566 is much wider so it envelopes focal volumes 568, 564 of the confocal slits.

Another alternative would be to construct a scanning laser system with lasers, for example, of blue and green spectra, in which the beams were focused and scanned along spots of different heights to provide the multiple images in one scan of the object.

Figure 17:
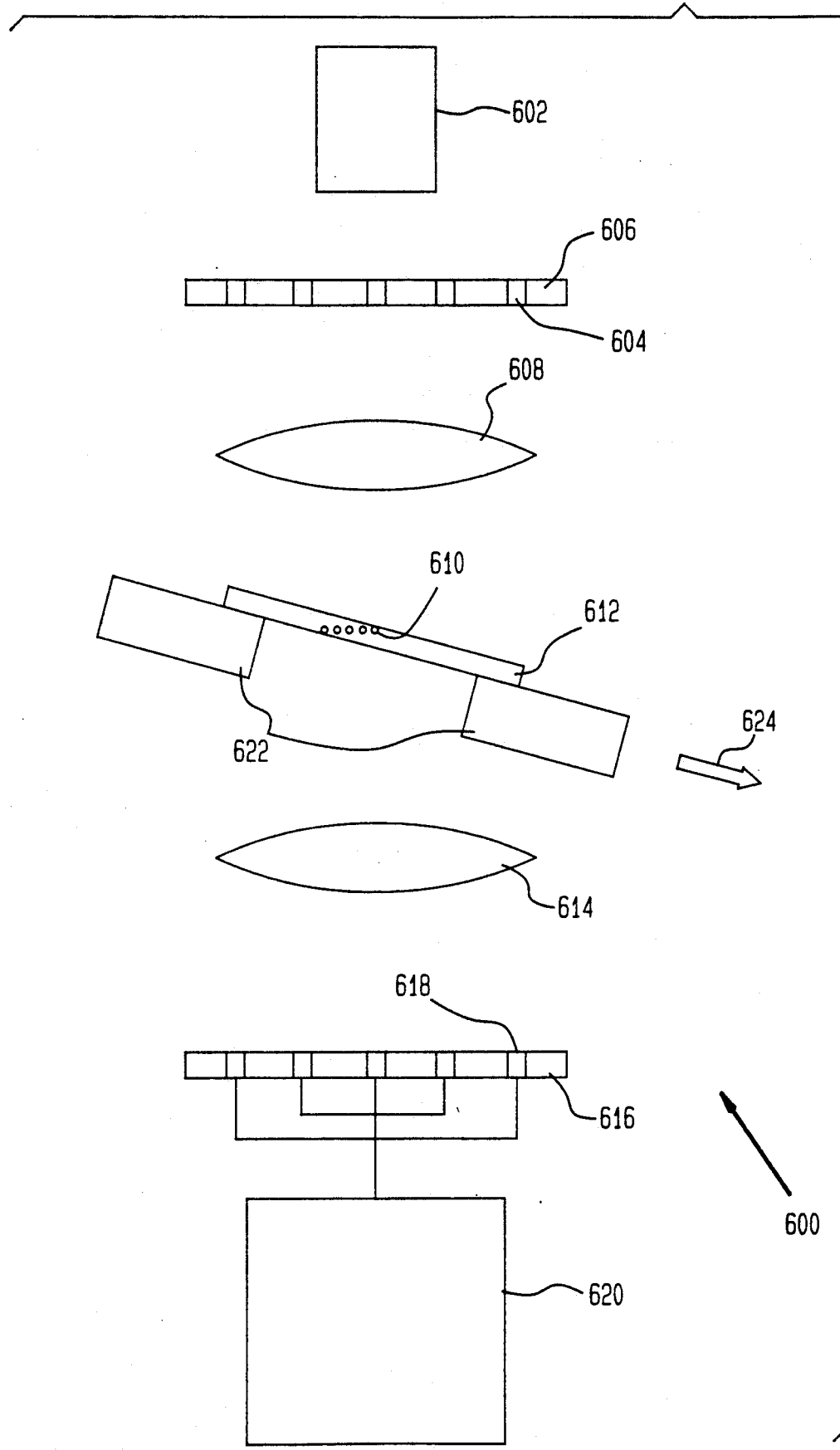
FIG. 17 is a block diagram of another specific embodiment of the imaging system of this invention similar to the diagram of FIG. 1, with a transmitting microscope.

FIG. 17 illustrates a transmitting microscope embodiment 600 of the invention for viewing partially transparent objects and would have particular application in scanning slides having biological media thereon. In a manner similar to the embodiment of FIG. 1, illuminator 602 directs electromagnetic radiation through a pattern of transparent apertures 604 in opaque source mask 606 to lens 608. Lens 608 focuses the radiation from each aperture into a small separate focal volume 610 which may be a small point or line in space known as a spot. If an opaque item or otherwise light-path disturbing item of object 612, is within a spot 610 the radiation is absorbed, deflected or reflected back toward source 602. Otherwise, the light is transmitted through object 612, through lens 614 which focuses the transmitted radiation onto an optically aligned array 616 of isolated pinpoint radiation sensors 618 in a pattern matching that of the image of the pattern 604 of apertures in source mask 606. Signals from the sensors 618 are directed to an electronic processor 620 which stores the data and arranges the data to generate full composite images of the object. If the path of the light rays passing through a spot is disturbed, then substantially all the light of that spot, will be scattered in the insensitive space between the pinpoint sensors 616 of sensor array 618. In order to minimize the reception of this stray radiation and crosstalk between spots, only a small fraction of the mask is transparent and only a corresponding small fraction of the area of array 618 is sensitive to radiation.

Stage 622 carries the object 612 in the direction indicated by arrow 624 which is inclined with respect to mask 606 and sensor array 616. Spots 610 are positioned at different depths in relation to the object 612 (i.e. at different perpendicular distances from stage 622). As the stage carries object 612 along the relatively inclined or tilted path, parts of the object which absorb, deflect or reflect light and which are positioned at these different depths (different perpendicular distances above the stage), pass through the spots 610 and are detected. Thus, the instrument detects the internal features of the object within the height range of the transmitting confocal imaging system as it passes continuously along the relatively inclined path.

The transmitting confocal imaging system of FIG. 17 is especially useful in detecting flaws or other radiation disturbing items that may be present in the transparent object 612. For example, automatically counting bacteria in a relatively thick culture.

The present invention can also implement darkfield confocal imaging for highlighting edges. In the most straightforward configuration of darkfield confocal imaging, there are separate illuminating transparent apertures 604 and imaging lens radiation sensors 618, wherein the central region of the illumination path lens 608 aperture stop is blocked, while the outer region of the imaging lens 614 aperture stop is blocked. This is readily accomplished using the transmissive version of FIG. 17 wherein the central portion of lens 608 would be blocked and the outer region of lens 614 would be blocked. However, for the reflective system shown in FIG. 1, a modification would be required where the beamsplitter 106 would be positioned between the object 112 and the lens 108 aperture stop (as is best shown in FIG. 5, where the beamsplitter 106 would be positioned between object 186 and lens aperture stop 190). A drawback of this modified arrangement is that it disadvantageously separates the mask 104 and sensor 116 from the beamsplitter 106 so that the arrangement shown in FIG. 10 could not be used.

Figure 18A:
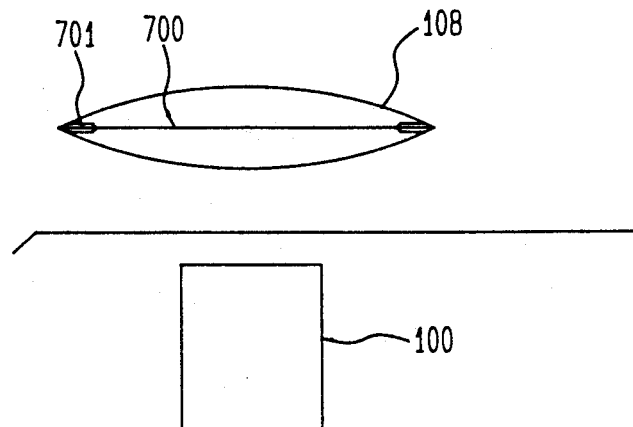
FIGS. 18a and 18b are side and top views respectively of a lens used in reflective confocal imaging.
Figure 18B:
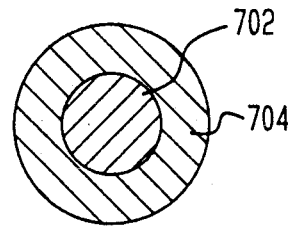

An alternative means for implementing darkfield reflective confocal imaging in which the advantages of the arrangement shown in FIG. 10 can be maintained may include the use of a filter element placed in the lens aperture. FIG. 18a is a side view of the lens 708 having polarizing filter element 700 positioned in the lens aperture 701. FIG. 18b shows the polarizing filter element 700 having a central circular region 702 and an outer annular region 704. Regions 702 and 704 are orthogonally polarized relative to one another.

Figure 19:
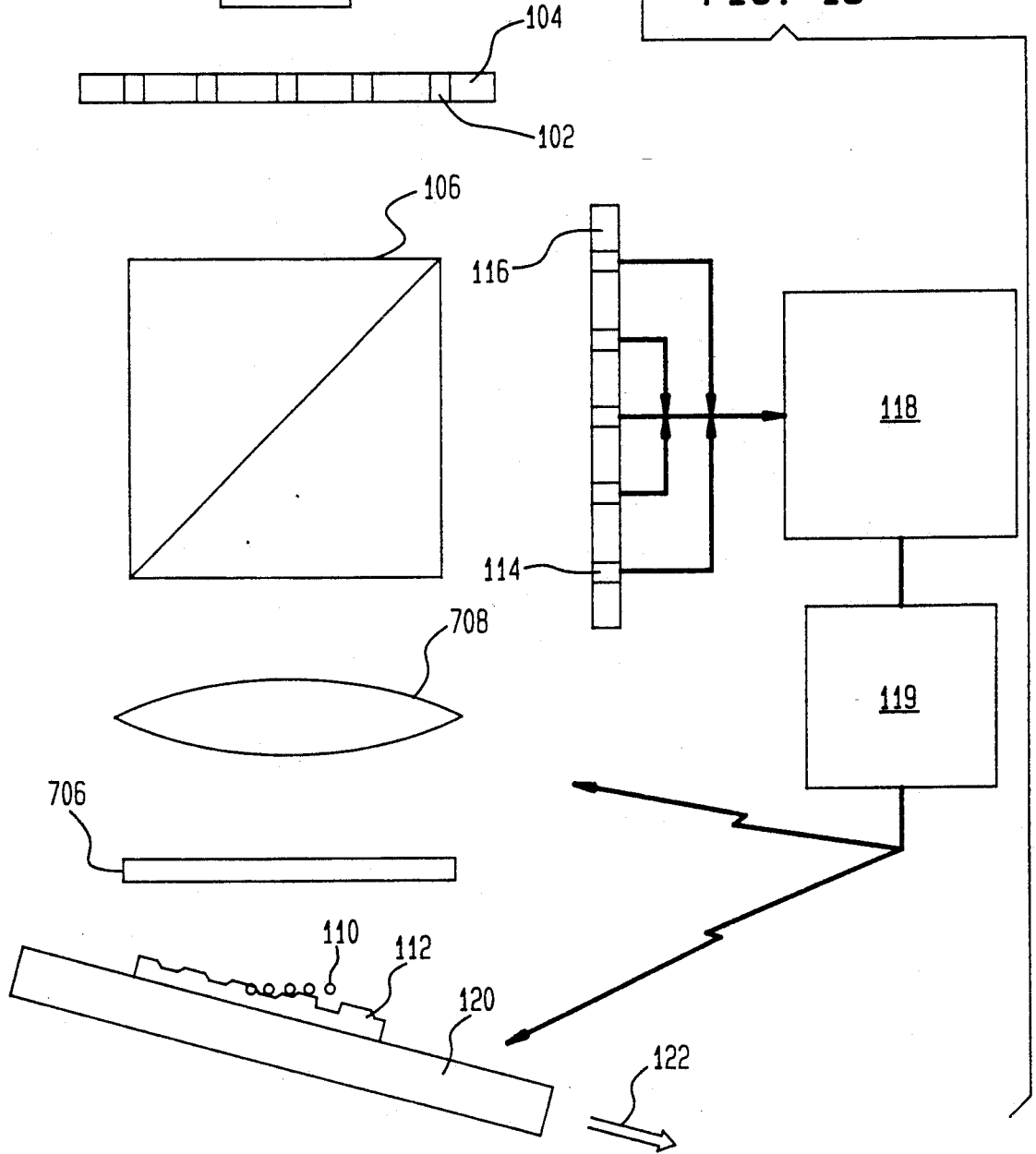
FIG. 19 is a block diagram of the imaging system shown in FIG. 1 which has been modified to allow reflective darkfield confocal imaging.

As shown in FIG. 19, a quarter wave plate 706 is positioned between the polarizer 700 in the lens 708 and the object 112. In operation, light that is incident on the lens aperture 701 from the illuminator 100 becomes linearly polarized depending on the region 702 or 704 it passes through. The quarter wave plate 706 converts the illumination to circular polarization whose left or right handedness again depends on the region of the lens aperture through which the light passed. After reflection from the object 112, those radiation rays that were reflected from the object 112 surfaces that are normal to the chief rays will pass through the quarter wave plate 706 and hit the same region of the polarizing filter element 700 that they had earlier passed through. The polarization of the light will have been rotated by 90 degrees by the quarter wave plate 706 and effectively all such light will be blocked by the polarizer 700. However, some of the rays that reflect from object surfaces that are not normal to the chief rays, or that are directed towards edges on the object 112 surface, will return to a different region of the polarizer 700, and will be transmitted. Such rays will be detected by the sensor array 116 and produce a darkfield image.

Other darkfield imaging arrangements could be implemented with the present invention.

The confocal imaging system of this invention could provide signals or data for using in automatically focussing the object to be imaged and/or inspected while it is scanned. This could be done because the height variations of the object to be inspected and/or imaged either is or could be calculated, for example, directly from the acquired data. Knowing the height information, the stage and/or object could be moved so that the height range to be imaged and/or inspected is positioned and remains within the height range of the confocal imaging system.

While the invention has been described in terms of its preferred embodiments, those skilled in the art will recognize that the invention can be practiced with modification within the spirit and scope of the appended claims.

Having thus described the invention, what is claimed as new and desired to be secured by Letters Patent is as follows:

1. A confocal imaging system for inspecting and/or imaging an object, comprising:
   means for conveying the object along a path;
   means for providing focused radiation in a pattern of multiple focal volumes at different heights and which are spatially separated from each other in a lateral direction in relation to said object in said path along which said object is conveyed, said radiation being transmitted or reflected in response to the topography of said object as it moves along said path;
   an array of detectors in an expanded pattern matched with said pattern of multiple focal volumes of focused radiation, each of said detectors in said array being sensitive to radiation from only one focal volume; and
   means for directing and focusing said transmitted or reflected radiation from said object onto said array of detectors.

2. The confocal imaging system of claim 1 in which said means for providing focused radiation in a pattern of multiple focal volumes comprises:
   a mask with a pattern of multiple confocal apertures with a width approximately equal to or smaller than the diffraction limit of the radiation and separated by several times the diffraction limit to minimize crosstalk;
   a source for directing radiation through said apertures; and means for directing and focusing the radiation into fields of view in the path along which the object is moving so that the object reflects or transmits the radiation depending upon the topography of the object.

3. The confocal imaging system of claim 2 in which the apertures are pinholes and the pattern of apertures comprise,
 a matrix of pinholes in said opaque mask positioned in an offset pattern for obtaining a complete image of said object in one continuous scan of said object.

4. The confocal imaging system of claim 3 in which the pattern of pinhole apertures comprise,
 a plurality of said matrices, each matrix of said plurality of matrices is positioned at a different distance from said path of the object for simultaneously obtaining multiple images of said object, each of said images being at a different level during one continuous scan of said object.

5. The confocal imaging system of claim 1 wherein said means for providing focused radiation in a pattern of multiple focal volumes comprises:
 a mask with a pattern of multiple confocal apertures; and
 a source for directing radiation through said multiple confocal apertures.

6. The confocal imaging system of claim 5 in which said confocal apertures in said mask are pinholes and said pattern of multiple confocal apertures comprises,
 a matrix of pinholes in said mask positioned in an offset pattern for obtaining a complete image of said object in one continuous scan of said object.

7. The confocal imaging system of claim 6, further comprising:
 a plurality of said matrices of pinholes, each matrix of said plurality of matrices being positioned at a different distance from said path of said object for simultaneously obtaining multiple images of said object, each of said images being at a different level during one continuous scan of said object.

8. The confocal imaging system of claim 5 in which said confocal apertures in said mask are confocal slits.

9. The confocal imaging system of claim 8, further comprising at least one wide gap slit in said mask for performing non-confocal microscopy in combination with said confocal slits of said pattern of multiple confocal apertures.

10. The confocal imaging system of claim wherein said means for providing focussed radiation in a pattern of multiple focal volumes comprises:
 a mask with a pattern of multiple confocal apertures;
 a source for directing radiation through said multiple confocal apertures; and
 a condenser positioned to collect light from said source and an array of lenses positioned to receive said collected light and direct said light through said multiple confocal apertures in said mask.

11. The confocal imaging system of claim 1 wherein said means for providing focussed radiation in a pattern of multiple focal volumes comprises:
 a source of radiation; and
 a plurality of fiber optic cables, each cable having a first end positioned to receive light from said source and a second end positioned to direct light towards said object.

12. The confocal imaging system of claim 11, further comprising,
 a mask with a pattern of multiple confocal apertures, said second end of each of said fiber optic cables being directed at an aperture of said multiple confocal apertures in said mask.

13. The confocal imaging system of claim 1, further comprising:
 a source for producing radiation that is directed towards said object; and
 a beamsplitter positioned between said source and said object, said beamsplitter operating in conjunction with said means for directing and focussing said transmitted or reflected radiation from said object onto said array of detectors.

14. The confocal imaging system of claim 13 wherein said array of detectors is secured to said beamsplitter.

15. The confocal imaging system of claim 13, further comprising:
 a mask with a pattern of multiple confocal apertures, said mask being secured to said beamsplitter.

16. The confocal imaging system of claim 1 wherein said means for providing focused radiation in a pattern of multiple focal volumes comprises a source of radiation and a source mask with a pattern of multiple confocal apertures wherein said source of radiation generates radiation that is directed through said multiple confocal apertures in said source mask, and wherein said means for directing and focussing said transmitted or reflected radiation from said object onto said detectors comprises a sensor mask positioned between said object and said array of detectors, said sensor mask being matched with said source mask.

17. The confocal imaging system of claim 16 wherein said source mask has a stepped surface with multiple confocal apertures on at least two steps of said stepped surface.

18. The confocal imaging system of claim 17 wherein said sensor mask has a stepped surface with openings on a least two steps of said stepped surface which correspond with said multiple confocal apertures on said stepped surface of said source mask.

19. The confocal imaging system of claim 1 wherein said means for providing focussed radiation in a pattern of multiple confocal volumes comprises a mask with a stepped surface with a pattern of multiple confocal apertures on at least two steps of said stepped surface.

20. The confocal imaging system of claim 1, further comprising a means for polarizing said focused radiation from said means for providing focussed radiation.

21. The confocal imaging system of claim 1 wherein said array of sensors are charge coupled device radiation sensors.

22. The confocal imaging system of claim 1 wherein said path on which said object is conveyed is non-perpendicular relative to a direction of said radiation provided by said means for providing focussed radiation.

23. The confocal imaging system of claim 1, further comprising an electronic processor for acquiring data signals from said array of sensors.

24. The confocal imaging system of claim 23, further comprising a means for smoothing data signals and generating height and extended focus images.

25. The confocal imaging system of claim 1 wherein said means for providing focussed radiation in a pattern of multiple focal volumes comprises a mask with both a pattern of multiple confocal apertures for confocal imaging and a window sufficiently wide for non-confocal imaging of said object.

26. The confocal imaging system of claim 1, further comprising:
one or more additional arrays of detectors for detecting radiation of different electromagnetic frequency;
means for separating said different frequencies of reflected or transmitted radiation and directing said radiation to said arrays of detectors;
and in which,
said means for supplying focused radiation supplies radiation in a multiple of different frequencies.

27. The confocal imaging system of claim 1, further comprising a means for adjusting a distance between said means for conveying said object along said path and said means for providing focused radiation in response to a determined height of a surface on said object.

28. The confocal imaging system of claim 1, further comprising a dark field imaging means associated with said means for providing focussed radiation and said array of detectors.

29. A method for inspecting and/or imaging an object, comprising the steps of:
conveying an object along a path;
providing focused radiation in a pattern of multiple focal volumes at different heights and which are spatially separated from each other in a lateral direction in relation to said object in said path along which said object is conveyed; and
detecting radiation that is transmitted or reflected in response to the topography of said object as it moves along said path with an array of detectors in an expanded pattern matched with said pattern of multiple focal volumes with each detector in said array detecting radiation from only on focal volume.

30. A method as recited in claim 29 wherein said step of detecting radiation comprises the steps of directing and focusing said transmitted or reflected radiation from said object onto said array of detectors.

31. A method as recited in claim 29 wherein said step of providing focused radiation comprises the step of directing radiation from a source through a pattern of multiple confocal apertures in a mask.

32. A method as recited in claim 29 further comprising the step of polarizing said focused radiation.

33. A method as recited in claim 29 wherein said step of providing focused radiation comprises supplying radiation in a multiple of different frequencies, and further comprising the steps of separating said different frequencies of radiation and detecting said different frequencies of radiation.

34. A method as recited in claim 29 further comprising the step of adjusting a distance between said path along which said object is conveyed and a means for providing said focussed radiation in response to a determined height of a surface on said object.

35. A method as recited in claim 29 further comprising the step of generating a dark field image.

36. A method as recited in claim 29 further comprising the step of adjusting an incline of said path on which said object is conveyed.

37. A method as recited in claim 29 further comprising the steps of generating both a dark field image and a bright field image.

* * * * *